United States Patent
Lee et al.

(10) Patent No.: US 12,439,258 B2
(45) Date of Patent: *Oct. 7, 2025

(54) METHOD AND DEVICE FOR CHANGING EUICC TERMINAL

(71) Applicant: Samsung Electronics Co., Ltd., Suwon-si (KR)

(72) Inventors: Duckey Lee, Suwon-si (KR); Hyewon Lee, Suwon-si (KR); Jonghan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,505

(22) Filed: Jan. 30, 2024

(65) Prior Publication Data

US 2024/0171981 A1     May 23, 2024

Related U.S. Application Data

(63) Continuation of application No. 17/436,052, filed as application No. PCT/KR2020/003418 on Mar. 12, 2020, now Pat. No. 11,917,413.

(30) Foreign Application Priority Data

Mar. 13, 2019  (KR) .................. 10-2019-0028870
Apr. 19, 2019   (KR) .................. 10-2019-0046232

(51) Int. Cl.
   *H04W 12/42*    (2021.01)
   *H04W 8/18*     (2009.01)
   (Continued)

(52) U.S. Cl.
   CPC ........... *H04W 12/42* (2021.01); *H04W 8/183* (2013.01); *H04W 8/205* (2013.01); *H04W 12/35* (2021.01); *H04W 12/37* (2021.01); *H04W 12/45* (2021.01)

(58) Field of Classification Search
   CPC ..... H04W 12/42; H04W 8/183; H04W 8/205; H04W 12/35; H04W 12/37; H04W 12/45; H04W 4/14; H04W 4/70
   See application file for complete search history.

(56) References Cited

U.S. PATENT DOCUMENTS 9,009,475 B2   4/2015   Hauck et al.
9,232,392 B2   1/2016   Lee et al.
(Continued)

FOREIGN PATENT DOCUMENTS

CN   107580790 A   1/2018
CN   108476399 A   8/2018
(Continued)

OTHER PUBLICATIONS

International Search Report and Written Opinion of the International Searching Authority dated Jun. 18, 2020 in connection with International Application No. PCT/KR2020/003418, 17 pages.
(Continued)

*Primary Examiner* — Mazda Sabouri

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). A terminal includes a transmission/reception unit, and at least one processor for controlling the terminal so as to receive a movement request of the profile from a user, confirm profile movement information, transmit, to a profile server, a message for requesting an activation code, receive the activation code and a profile deletion need from (Continued)

the profile server, delete the profile, transmit the deletion result of the profile to the profile server, transfer the activation code to another terminal, receive the activation code from another terminal, transmit a message for requesting the profile to the profile server by using the activation code, receive a profile package from the profile server, and install the profile package.

14 Claims, 15 Drawing Sheets

(51) Int. Cl.
*H04W 8/20* (2009.01)
*H04W 12/30* (2021.01)
*H04W 12/37* (2021.01)
*H04W 12/45* (2021.01)

(56) References Cited

U.S. PATENT DOCUMENTS

| | | |
|---|---|---|
| 9,294,919 B2 | 3/2016 | Merrien et al. |
| 9,674,690 B2 | 6/2017 | Lee et al. |
| 9,800,993 B2 | 10/2017 | Lee et al. |
| 10,187,784 B1 | 1/2019 | Chen et al. |
| 2014/0357229 A1 | 12/2014 | Lee et al. |
| 2015/0237496 A1 | 8/2015 | Gao et al. |
| 2016/0241537 A1 | 8/2016 | Cha et al. |
| 2016/0301529 A1 | 10/2016 | Park et al. |
| 2017/0156051 A1 | 6/2017 | Park et al. |
| 2017/0273119 A1 | 9/2017 | Le et al. |
| 2018/0124595 A1 | 5/2018 | Park et al. |
| 2019/0020997 A1 | 1/2019 | Park |
| 2019/0075453 A1 | 3/2019 | Yoon et al. |
| 2019/0208405 A1 | 7/2019 | Park et al. |
| 2020/0059778 A1 | 2/2020 | Li et al. |
| 2021/0314763 A1 | 10/2021 | Neuhaeuser |

FOREIGN PATENT DOCUMENTS

| | | |
|---|---|---|
| KR | 10-2014-0140882 A | 12/2014 |
| KR | 10-2018-0028729 A | 3/2018 |
| KR | 10-1893934 B1 | 8/2018 |
| WO | 2018076711 A1 | 5/2018 |

OTHER PUBLICATIONS

Supplementary European Search Report dated Mar. 4, 2022, in connection with European Application No. 20769882.0, 12 pages.
Examination Report dated May 31, 2023, in connection with Indian Patent Application No. 202137039692, 7 pages.
Office Action dated Oct. 20, 2023, in connection with Korean Patent Application No. 10-2019-0046232, 9 pages.
The First Office Action dated Feb. 27, 2024, in connection with Chinese Application No. 202080020825.3, 22 pages.
Notice of Grant of Invention Patent Right dated Mar. 25, 2025, in connection with Chinese Application No. 202080020825.3, 7 pages.

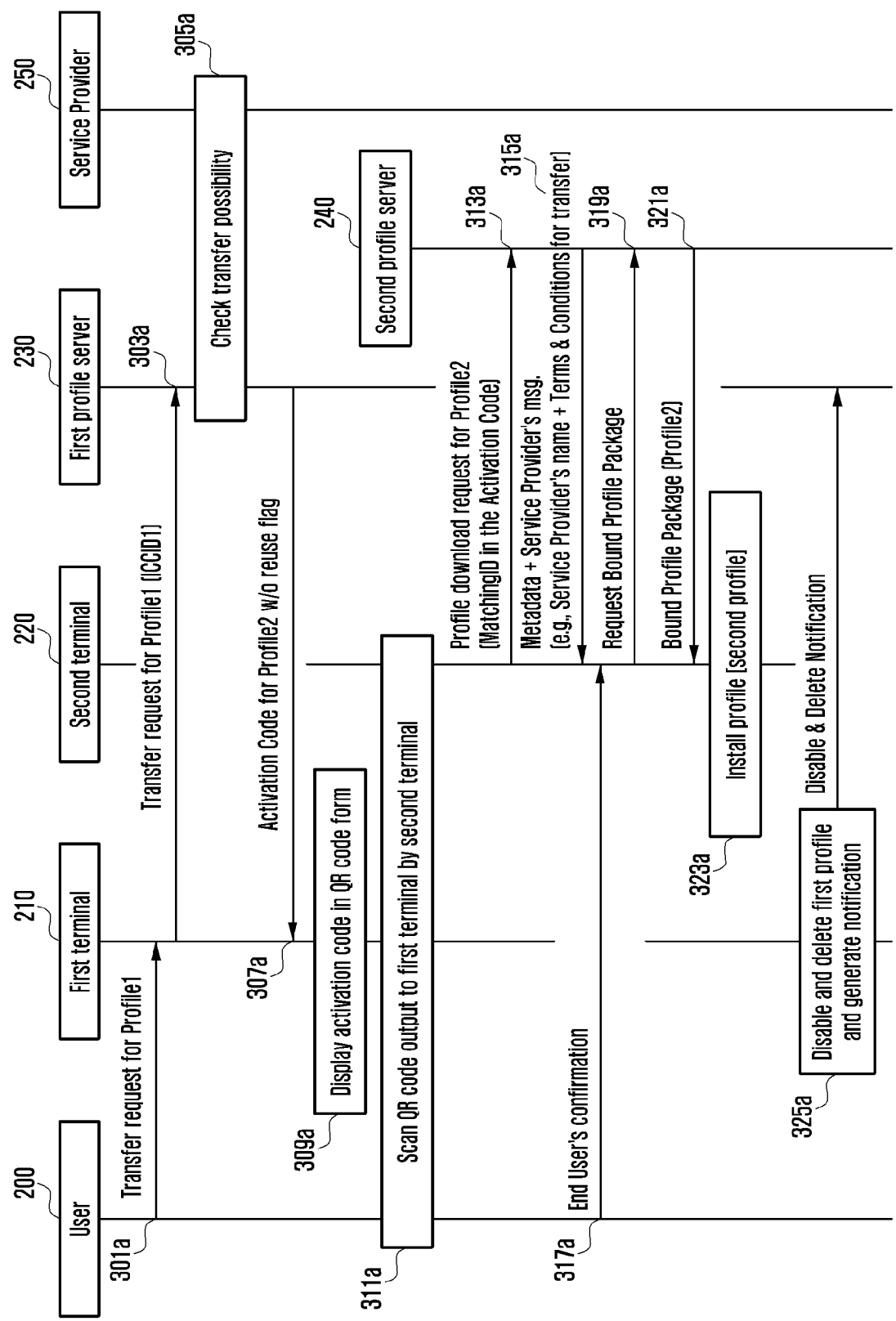

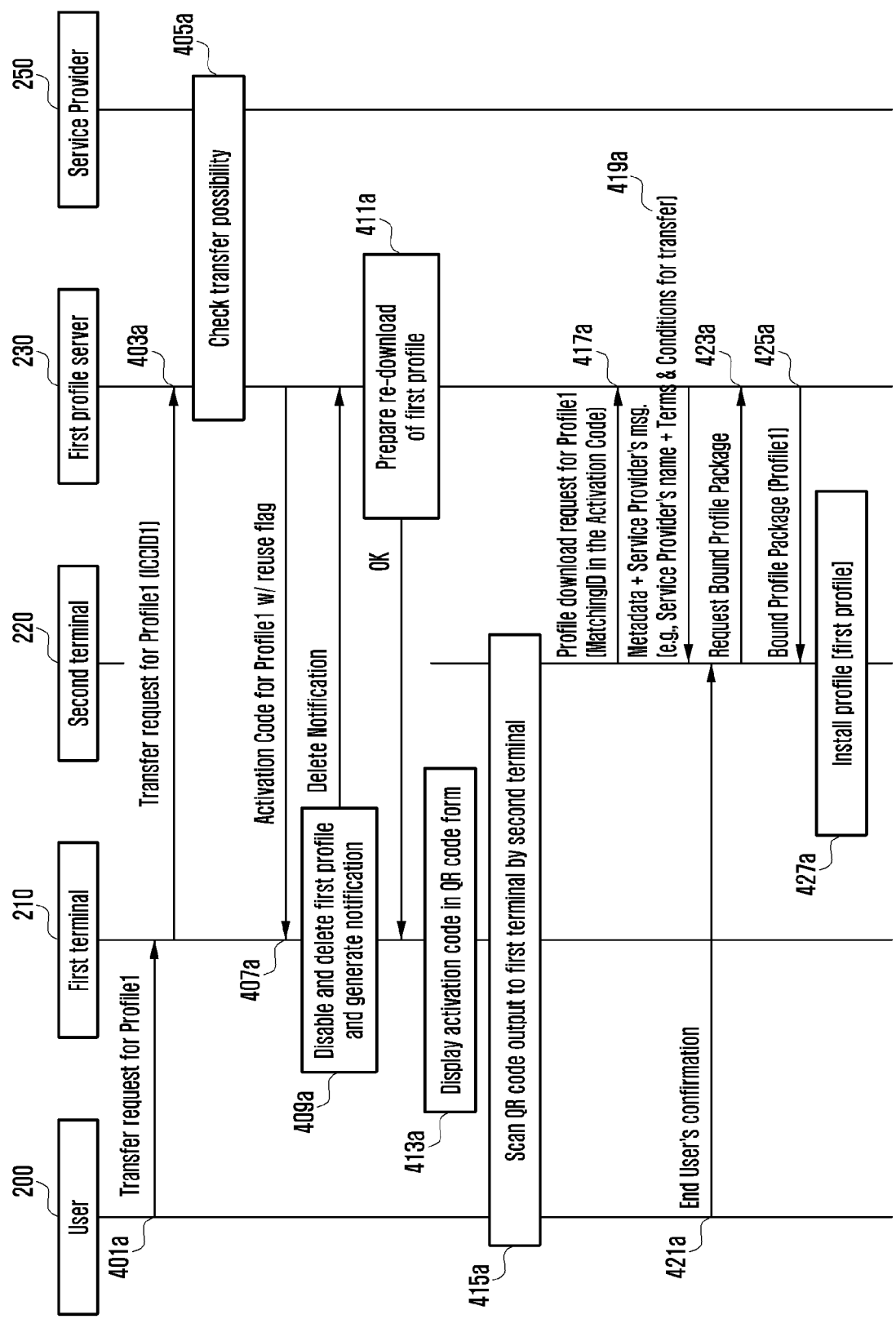

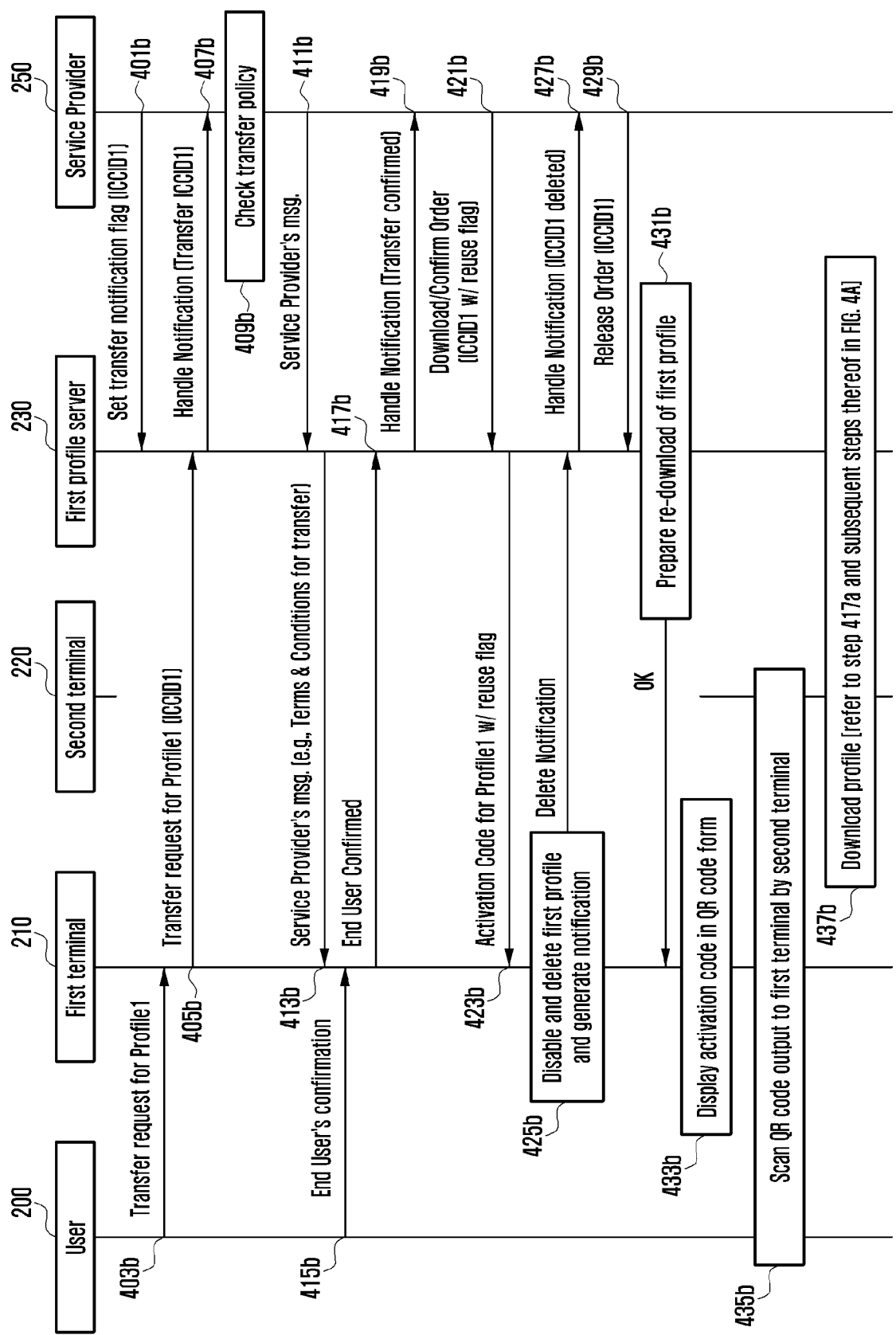

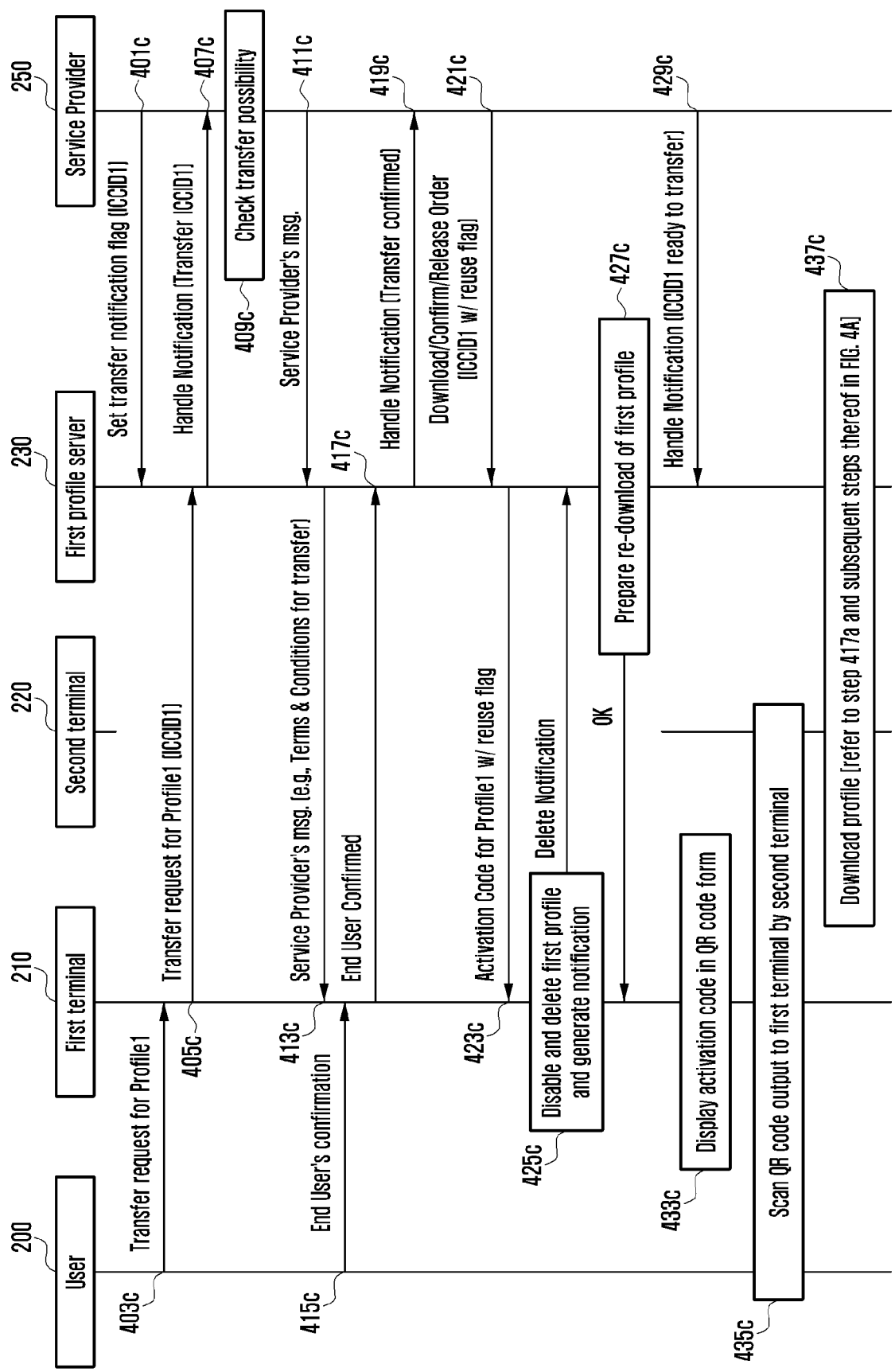

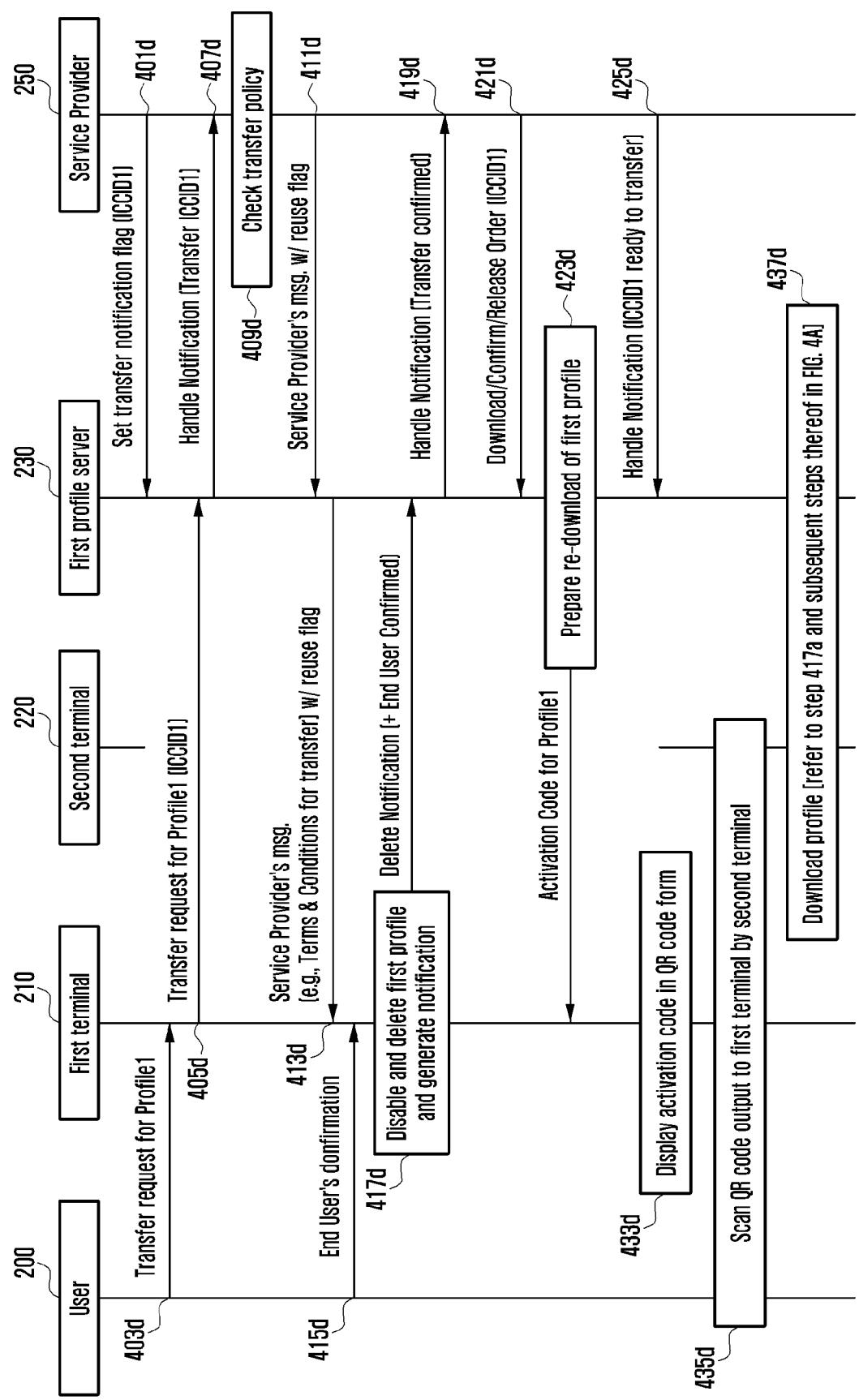

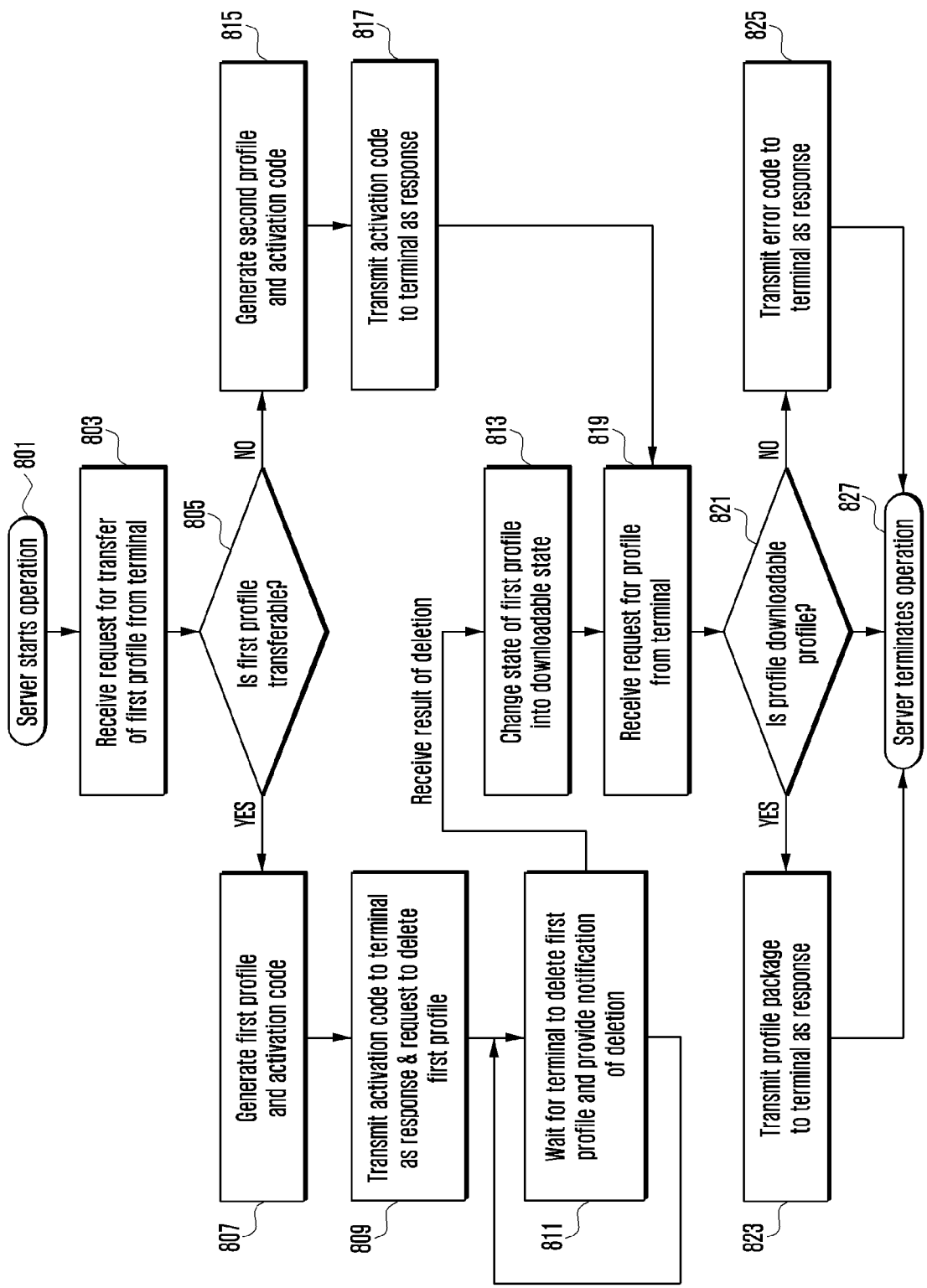

METHOD AND DEVICE FOR CHANGING EUICC TERMINAL

CROSS-REFERENCE TO RELATED APPLICATIONS

This application is a continuation of application Ser. No. 17/436,052 which is a 371 National Stage of International Application No. PCT/KR2020/003418, filed Mar. 12, 2020, which claims priority to Korean Patent Application No. 10-2019-0028870 filed on Mar. 13, 2019, and Korean Patent Application No. 10-2019-0046232 filed on Apr. 19, 2019, the disclosures of which are herein incorporated by reference in their entirety.

BACKGROUND

1. Field

The present disclosure relates to a method and device for installing and managing an eUICC profile.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as various services can be provided with the development of the mobile communication system, there is a need for a scheme capable of effectively providing such services.

A "universal integrated circuit card (UICC)" is a smart card that is used by being inserted into a mobile communication terminal, etc., and is also called a UICC card. The UICC may include an access control module for enabling a terminal to access a network of a mobile operator. Examples of such an access control module include a universal subscriber identity module (USIM), a subscriber identity module (SIM), an IP multimedia service identity module (ISIM), etc. A UICC including the USIM is commonly called a USIM card. Likewise, a UICC including the SIM is commonly called a SIM card.

A UICC card that is fixed to a terminal and used among UICC cards is called an embedded UICC (eUICC). In general, the eUICC means a UICC card that is fixed to a terminal and used and may remotely download and select an SIM module. Furthermore, downloaded SIM module information is commonly called an eUICC profile or more simply a profile.

SUMMARY

The present disclosure is to effectively provide services in a mobile communication system.

According to an embodiment disclosed in the present disclosure, there can be provided a method and device for selecting, by a terminal, a communication service in a communication system and connecting to a network.

According to an embodiment disclosed in the present disclosure, there can be provided a method and device for online downloading, installing and managing, by a terminal, a profile for connecting to a network in a communication system.

According to an embodiment disclosed in the present disclosure, there can be provided a method and device for efficiently downloading, by a terminal, a profile installed in order to connect to a network again in another terminal in a communication system.

Technical objects to be achieved in embodiments of the present disclosure are not limited to the aforementioned technical objects, and other technical objects not described above may be evidently understood by a person having ordinary knowledge in the art to which the present disclosure pertains from the following description.

In the present disclosure, a method performed by a server in a wireless communication system, comprising: receiving, from a first terminal, a request for transfer of a first profile;

identifying a possibility of the transfer of the first profile based on the received request for the transfer of the first profile; and transmitting, to the first terminal, an activation code for a second profile.

In some examples, the method further includes receiving, from a service provider, a message for setting a policy related to the request for the transfer of the first profile from the first terminal.

In some examples, the method further includes transmitting, to a service provider, information indicating that the request for the transfer of the first profile has been received from the first terminal, receiving, from the service provider, a first message including information to be noted by a user determined based on a transfer policy for the first profile based on a transfer policy for the first profile and transmitting the first message to the first terminal.

In some examples, the method further includes receiving, from the user, a second message including information on whether to consent for the transfer of the first profile determined based on the first message is given, transmitting, to the service provider, a third message including information on whether to consent for the transfer of the first profile based on the second message, and receiving a fourth message related to the second profile.

In some examples, the method further includes receiving, from a second terminal, a request for download of a second profile, transmitting, to the second terminal, a fifth message including information on the second profile and information to be noted by a user, receiving, from the second terminal, a request for information on whether to consent for the download of the second profile and a profile package based on the fifth message, and transmitting the profile package to the second terminal.

In another example of the present disclosure, a method by a first terminal in a wireless communication system includes receiving, from a user, a request for the transfer of a first profile, transmitting, to a server, a message to request an activation code based on the request for the transfer of the first profile, and receiving, from the server, an activation code for a second profile, wherein the activation code for the second profile is determined based on the server and a service provider.

In some examples, the method further includes transmitting the activation code for the second profile to a second terminal. The activation code is marked as a QR code.

In some examples, the method further includes disabling the first profile, and transmitting results of the disabling to the server.

In still another example of the present disclosure, a server includes a transceiver capable of transmitting and receiving at least one signal and a controller coupled to the transceiver. The controller is configured to receive, from a first terminal, a request for the transfer of a first profile, identify a possibility of the transfer of the first profile based on the received request for the transfer of the first profile, and transmit, to the first terminal, an activation code for a second profile.

In still another example of the present disclosure, a first terminal includes a transceiver capable of transmitting and receiving at least one signal and a controller coupled to the transceiver. The controller is configured to receive, from a user, a request for the transfer of a first profile, transmit, to a server, a message to request an activation code based on the request for the transfer of the first profile, and receive, from the server, an activation code for a second profile. The activation code for the second profile is determined based on the server and a service provider.

Furthermore, a terminal managing a profile for connecting to a network by using an embedded universal integrated circuit card (eUICC) in a wireless communication system according to an embodiment of the present disclosure may include a transceiver; and at least one processor controlling the terminal to receive a request for the transfer of the profile from a user, confirm profile transfer information, transmit, to a profile server, a message to request an activation code, receive, from the profile server, the activation code and whether it is necessary to delete the profile, delete the profile, transmit the results of the deletion of the profile to the profile server, deliver the activation code to another terminal, receive the activation code from the another terminal, transmit, to the profile server, a message to request the profile by using the activation code, receive a profile package from the profile server, and install the profile package.

In a wireless communication system according to an embodiment, a profile server providing a terminal with a profile for a network connection may include a transceiver; and at least one processor controlling the profile server to receive a request message for the transfer of the profile from the terminal, identify whether the profile is transferable, generate an activation code on which the profile or a new profile is downloadable, set a state of the profile as a download-impossible state when the transfer of the profile is possible, set a state of the new profile as a downloadable state when the transfer of the profile is impossible, transmit, to the terminal, a message including the activation code and whether it is necessary to delete the profile, receive the results of the deletion of the profile from the terminal, change the state of the profile into the downloadable state, receive a profile download request message from the terminal, identify whether a state of the profile is the downloadable state, transmit a profile package to the terminal when the state of the profile is the downloadable state, and transmit an error code when the state of the profile is the download-impossible state.

According to an embodiment of the present disclosure, services can be effectively provided in a mobile communication system.

According to an embodiment of the present disclosure, in a communication system, when a terminal attempts to install, in another terminal, a profile installed in the terminal again, the terminal may have an activation code necessary for the re-installation of the profile again issued by the profile server or extract the activation code necessary for the re-installation of the profile from information stored in the terminal or the profile, may first delete a profile to be transferred, if necessary, and may deliver the activation code to the another terminal. The another terminal can efficiently download the profile from the profile server and install the profile.

According to an embodiment of the present disclosure, in a communication system, when the profile server receives, from a terminal, a request for the re-installation of a profile installed in the terminal in another terminal, the profile server can prevent the duplication of a profile and safely process profile download in a way to request the terminal to delete a profile by setting a state of the profile as a download-impossible state when the profile can be reused, to prepare another profile by setting a state of the another profile as a downloadable state when the profile cannot be reused, to generate an activation code on which the prepared profile can be downloaded, and to change a state of the profile to a downloadable state if the terminal has deleted the profile.

BRIEF DESCRIPTION OF THE DRAWINGS

FIG. 3A is a diagram illustrating a procedure of receiving, by the first terminal according to an embodiment of the present disclosure, an activation code through a profile server and downloading a new profile by delivering the activation code to the second terminal.

FIG. 4A is a diagram illustrating a procedure of receiving, by the first terminal according to an embodiment of the present disclosure, an activation code through a profile server and downloading the same profile again by delivering the activation code to the second terminal.

FIG. 4B is a diagram illustrating another procedure of receiving, by the first terminal according to an embodiment of the present disclosure, an activation code through a profile server and downloading the same profile again by delivering the activation code to the second terminal.

FIG. 4C is a diagram illustrating still another procedure of receiving, by the first terminal according to an embodiment of the present disclosure, an activation code through a profile server and downloading the same profile again by delivering the activation code to the second terminal.

FIG. 4D is a diagram illustrating still another procedure of receiving, by the first terminal according to an embodiment of the present disclosure, an activation code through a profile server and downloading the same profile again by delivering the activation code to the second terminal.

FIG. 8 is a flowchart illustrating an operational procedure of a profile server according to an embodiment of the present disclosure.

DETAILED DESCRIPTION

Figure 1:
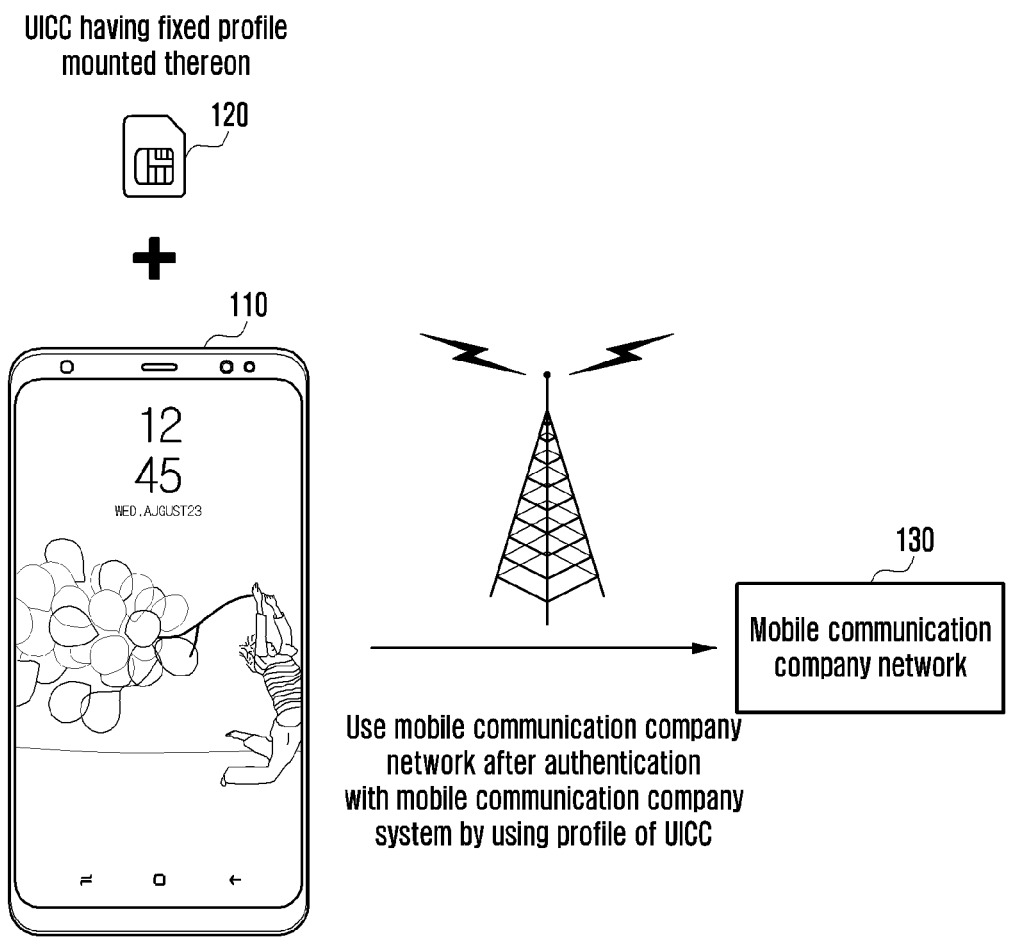
FIG. 1 is a diagram illustrating a method of connecting, by a terminal according to an embodiment of the present disclosure, to a mobile communication network by using a universal integrated circuit card (UICC) on which a fixed profile has been mounted.

Hereinafter, embodiments of the present disclosure are described in detail with reference to the accompanying drawings.

In describing the embodiments, a description of technology contents that are well known in the art to which the present disclosure pertains and that are not directly related to the present disclosure is omitted in order to clearly deliver the gist of the present disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the present disclosure and a method for achieving the advantages and characteristics will become apparent from the embodiments described in detail in conjunction with the accompanying drawings. However, the present disclosure is not limited to the disclosed embodiments, but may be implemented in various different forms. The embodiments are provided to only complete the present disclosure and to fully notify a person having ordinary knowledge in the art to which the present disclosure pertains of the category of the present disclosure. The disclosure is defined by the category of the claims. Throughout the specification, the same reference numerals denote the same elements.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage medium that can direct a computer or other programmable data processing equipment to implement a function in a particular manner, such that the instructions stored in the a computer-usable or computer-readable storage medium produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as an FPGA or an ASIC, and the "unit" performs specific tasks. However, the term "unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card.

Specific terms used in embodiments of the present disclosure are provided to help understanding of the present disclosure. The use of such a specific term may be changed into another form without departing from the technical spirit of the present disclosure.

In the present disclosure, a "universal integrated circuit card (UICC)" is a smart card that is used by being inserted into a mobile communication terminal, etc., and is also called a UICC card.

The UICC means a chip in which personal information of a mobile communication subscriber, such as network access certification information, a telephone directory, or SMS, is stored and which enables the safe use of mobile communication by generating a subscriber authentication and traffic security key upon access to a mobile communication network, such as GSM, WCDMA, LTE, etc.

The UICC may include a communication application or an access control module for enabling a terminal to access a network of a mobile operator. Examples of such a communication application or access control module include a universal subscriber identity module (USIM), a subscriber identity module (SIM), an IP multimedia service identity module (ISIM), etc. Furthermore, the UICC may provide a security function having a higher level, for mounting various applications, such as an electronic wallet, ticketing, or an electronic password.

A UICC including a USIM is commonly called a USIM card. Likewise, a UICC including a SIM module is commonly called a SIM card.

In the present disclosure, a "SIM card", a "UICC card", a "USIM card", and a "UICC including an ISIM" may be used as the same meaning. That is, the contents of the present disclosure may be identically applied to the SIM card, the USIM card, the ISIM card or a common UICC card.

The SIM card stores personal information of a mobile communication subscriber, and enables the safe use of mobile communication by generating a subscriber authentication and traffic security key upon access to a mobile communication network.

In general, the SIM card is fabricated as a dedicated card for a corresponding operator in response to a request from a specific mobile operator, and is released with certification information of a corresponding operator for connecting to a network, for example, a universal subscriber identity module (USIM) application, an international mobile subscriber identity (IMSI), a K value, an OPc value, etc. previously mounted on the card. Accordingly, the SIM card is supplied to the mobile operator and provided to the subscriber. Thereafter, the mobile service provider may perform management, such as the installation, modification, deletion, etc. of an application within a UICC by using a technology, such as over the air (OTA), if necessary. The subscriber may use application services along with a network of the mobile operator by inserting the UICC card into an owned mobile communication terminal, and may use, in a new terminal, certification information, a mobile communication telephone number, a personal telephone directory, etc. stored in the UICC card without any change by transferring and inserting the UICC card from the existing terminal to the new terminal upon replacement of the terminal.

However, the SIM card makes a mobile communication terminal user feel inconvenient in receiving services from another mobile operator. The mobile communication terminal user feels inconvenient because he or she has to physically obtain the SIM card in order to receive services from a mobile service provider. For example, when traveling another country, a user feels inconvenient because he or she has to obtain a local SIM card in order to receive a local mobile communication service. Roaming service solves such inconvenience to some extent, but has problems in that it is relatively expensive and cannot be provided if a contract is not made between communication companies.

If the SIM module is remotely downloaded and installed in a UICC card, such inconvenience can be greatly solved. That is, a user can download, to the UICC card, the SIM module to be used at desired timing. In such a UICC card, a method of downloading and installing a plurality of SIM modules and selecting only one of the SIM modules may be used. Such a UICC card may be fixed or may not be fixed to a terminal. In particular, a UICC that is used by being fixed to a terminal is called an embedded UICC (eUICC). In general, the eUICC means a UICC card which can be used by being fixed to a terminal, to which a SIM module can be remotely downloaded and in which the downloaded SIM module can be selected. In the present disclosure, a UICC card to which a SIM module can be remotely downloaded and in which the downloaded SIM module can be selected is called an eUICC. That is, a UICC card that is fixed or not fixed to a terminal among UICC cards to which a SIM module can be remotely downloaded and in which the downloaded SIM module can be selected is commonly used as an eUICC. Furthermore, downloaded SIM module information is commonly used as a term called an eUICC profile or more simply a profile.

In the present disclosure, an "embedded UICC (eUICC)" is a security module having a chip form inserted into a terminal, not a detachable type in which the eUICC can be inserted into and detached from a terminal. A profile may be downloaded and installed in the eUICC by using the over the air (OTA) technology. The eUICC may be named a UICC in which a profile can be downloaded and installed.

In the present disclosure, a method of downloading and installing a profile in the eUICC by using the OTA technology may also be applied to the detachable type UICC which can be inserted into and detached from a terminal. That is, an embodiment of the present disclosure may be applied to a UICC in which a profile can be downloaded and installed using the OTA technology.

In the present disclosure, a "UICC" may be interchangeably used with a "SIM", and an "eUICC" may be interchangeably used with an "eSIM".

In the present disclosure, a "profile" may mean that an application, a file system, an authentication key value, etc. stored in a UICC are packaged in a software form.

In the present disclosure, a "USIM profile" may have the same meaning as a "profile" or may mean that information included in a USIM application within a profile is packaged in a software form.

In the present disclosure, an operation of enabling, by a terminal, a profile may mean an operation of setting, by the terminal, a state of the profile by changing the state of the profile to an enabled state so that the terminal can receive a communication service through a mobile operator that provides the corresponding profile. The profile in the enabled state may be represented as an "enabled profile".

In the present disclosure, an operation of disabling, by a terminal, a profile may mean an operation of setting, by the terminal, a state of the profile by changing the state of the profile to a disabled state so that the terminal cannot receive a communication service through a mobile operator that provides the corresponding profile. The profile in the disabled state may be represented as a "disabled profile".

In the present disclosure, an operation of deleting, by a terminal, a profile may mean an operation of setting, by the terminal, a state of the profile by changing the state of the profile to a deleted state so that the terminal can no longer enable or disable the corresponding profile. The profile in the deleted state may be represented a "deleted profile".

In the present disclosure, an operation of enabling, disabling or deleting, by a terminal, a profile may mean an operation of first marking a state of each profile as a to-be-enabled state, a to-be-disabled state, or a to-be-deleted state without immediately changing the state of each profile into an enabled state, a disabled state, or a deleted state, performing, by the terminal or the UICC of the terminal, a specific operation (e.g., perform refresh or a reset command), and then changing the state of each profile to the enabled state, the disabled state, or the deleted state. An operation of marking a state of a specific profile as a to-be state (i.e., the to-be-enabled state, the to-be-disabled state, or the to-be-deleted state) is not essentially limited to marking one to-be state with respect to one profile. States of one or more profiles may be marked as the same or different to-be states, a state of one profile may be marked as one or more to-be states, or states of one or more profiles may be marked as the same or one or more different to-be states.

Furthermore, if a terminal marks one or more to-be states for a given profile, marked two to-be states may be integrated into one state. For example, if a state of a given profile is marked as a to-be-disabled state and a to-be-deleted state, the to-be-disabled state and to-be-deleted state of the corresponding profile may be integrated and marked as the to-be disabled or deleted state.

Furthermore, an operation of marking, by a terminal, states of one or more profiles as to-be states may be sequentially or simultaneously performed. Furthermore, an operation of marking, by a terminal, states of one or more profiles as to-be states and then changing an actual state of the profile may be sequentially or simultaneously performed.

In the present disclosure, a "profile provision server" may include a function for generating a profile, encrypting a generated profile, generating a profile remote management command, or encrypting a generated profile remote management command. The profile provision server may be represented as subscription manager data preparation (SM-DP), subscription manager data preparation plus (SM-DP+), an off-card entity of a profile domain, a profile encryption server, a profile generation server, a profile provisioner (PP), a profile provider, or a profile provisioning credentials (PPC) holder.

In the present disclosure, a "profile management server" may include a function for managing a profile. The profile management server may be represented as subscription manager secure routing (SM-SR), subscription manager secure routing plus (SM-SR+), an off-card entity of an eUICC profile manager, a profile management credentials (PMC) holder, an eUICC manager (EM), a profile manager (PP), etc.

In the present disclosure, the profile provision server may mean a combination of functions of the profile management server. Accordingly, in various embodiments of the present disclosure, an operation of the profile provision server may be performed in the profile management server. Likewise, an operation of the profile management server or the SM-SR may be performed in the profile provision server.

In the present disclosure, a "discovery relay server" may be represented as a subscription manager discovery service (SM-DS), a discovery service (DS), a root discovery relay server (root SM-DS), an alternative discovery relay server (alternative SM-DS). The discovery relay server may receive an event register request (or a register event request) from one or more profile provision servers or discovery relay servers. Furthermore, one or more discovery relay servers may be complexly used. In this case, a first discovery relay server may receive an event register request from a second discovery relay server in addition to a profile provision server.

In the present disclosure, the profile provision server and the discovery relay server may be used as names called a "remote SIM provisioning (RSP) server". The RSP server may be represented a subscription manager XX (SM-XX).

In the present disclosure, a "terminal" may be denoted as a mobile station (MS), a user equipment (UE), a user terminal (UT), a radio terminal, an access terminal (AT), a terminal, a subscriber unit, a subscriber station (SS), a wireless device, a wireless communication device, a wireless transmit/receive unit (WTRU), a mobile node, a mobile or other terms. In an embodiment, a terminal may include a cellular phone, a smartphone having a wireless communication function, a portable digital assistant (PDA) having a wireless communication function, a wireless modem, a portable computer having a wireless communication function, a photographing device such as a digital camera having a wireless communication function, a gaming device having a wireless communication function, music storage and playback home appliances having a wireless communication function, Internet home appliances capable of wireless Internet access and browsing, and may also include a portable unit or terminals in which combinations of such functions are integrated. Furthermore, a terminal may include a machine to machine (M2M) terminal, a machine type communication (MTC) terminal/device, but the present disclosure is not limited thereto. In the present disclosure, a terminal may also be denoted as an electronic device.

In the present disclosure, a UICC in which a profile can be downloaded and installed may be embedded in an "electronic device". If a UICC is not embedded in an electronic device, the UICC physically separated from the electronic device may be inserted into the electronic device and coupled to the electronic device. For example, the UICC may be inserted into the electronic device in a card form. The electronic device may include a terminal. In this case, the terminal may be a terminal including a UICC in which a profile can be downloaded and installed. If a UICC may be embedded in a terminal and the terminal and the UICC are separated, the UICC may be inserted into the terminal, and may be inserted into the terminal and coupled to the terminal. A UICC in which a profile can be downloaded and installed may be denoted as an eUICC, for example.

In the present disclosure, a terminal or an electronic device may include software or an application installed in the terminal or the electronic device in order to control a UICC or an eUICC. The software or the application installed in the terminal or the electronic device in order to control the UICC or the eUICC may be denoted as a local profile assistant (LPA), for example.

In the present disclosure, a "profile delimiter" may be denoted as a factor matched with a profile ID, an integrated circuit card ID (ICCID), a matching ID, an event ID, an activation code, an activation code token, a command code, a command code token, a signed command code, an unsigned command code, ISD-P or a profile domain (PD). The profile ID may indicate a unique ID of each profile. The profile delimiter may further include an address of a profile provision server (SM-DP+) capable of indexing a profile. Furthermore, the profile delimiter may further include a signature of a profile provision server (SM-DP+).

In the present disclosure, an "eUICC ID" may be a unique ID of an eUICC embedded in a terminal, and may be denoted as an EID. Furthermore, if a provisioning profile is previously mounted on an eUICC, an eUICC ID may be an ID of the corresponding provisioning profile. Furthermore, in an embodiment of the present disclosure, if a terminal and an eUICC chip are not separated, an eUICC ID may be a terminal ID. Furthermore, an eUICC ID may denote a specific secure domain of an eUICC chip.

In the present disclosure, a "profile container" may be named a profile domain. The profile container may be a secure domain.

In the present disclosure, an "application protocol data unit (APDU)" may be a message for enabling a terminal to operate in conjunction with an eUICC. Furthermore, the APDU may be a message for enabling a profile provider (PP) or a profile manager (PM) to operate in conjunction with an eUICC.

In the present disclosure, "profile provisioning credentials (PPC)" may be means used for mutual authentication and profile encryption between a profile provision server and an eUICC, and a signature. The PPC may include one or more of a symmetry key, Rivest Shamir Adleman (RSA) certificate and a private key, an elliptic curved cryptography (ECC) certificate and a private key, a root certification authority (CA), and a certificate chain. Furthermore, if a profile provision server is in plural, a different PPC may be stored or used in an eUICC by a plurality of profile provision servers.

In the present disclosure, "profile management credentials (PMC)" may be means used for mutual authentication and transmission data encryption between a profile management server and an eUICC, and a signature. The PMC may include one or more of a symmetry key, an RSA certificate and a private key, an ECC certificate and a private key, a root CA, and a certificate chain. Furthermore, if a profile management server is in plural, a different PMC may be stored or used in an eUICC by a plurality of profile management servers.

In the present disclosure, an "AID" may be an application identifier. This value may be a delimiter to distinguish between different applications within an eUICC.

In the present disclosure, an "event" may be a term that commonly denotes profile download, remote profile management, or a management/processing command of other profile or eUICC. The event may be named a remote SIM provisioning operation, an RSP operation, an RSP operation or an event record. Each event may be denoted as data including at least one of a corresponding event identifier (event ID, EventID) or a matching identifier (matching ID, MatchingID), a profile provision server (SM-DP+) in which a corresponding event is stored or an address (FQDN, IP address, or URL) of a discovery relay server (SM-DS), a signature of a profile provision server (SM-DP+) or a discovery relay server (SM-DS), or a digital certificate of a profile provision server (SM-DP+) or a discovery relay server (SM-DS).

Data corresponding to an event may be denoted as a "command code". Some of or the entire procedure using a command code may be denoted as a "command code processing procedure" or a "command code procedure" or an "local profile assistant application programming interface (LPA API)". Profile download may be interchangeably used with profile installation.

Furthermore, an "event type" may be used as a term indicating whether a specific event is profile download or remote profile management (e.g., deletion, enabling, disabling, replacement, updates, etc.) or is a profile or eUICC management/processing command, and may be named an operation type (or OperationType), an operation class (or OperationClass), an event request type, an event class, an event request class, etc. A path along which a terminal obtains a given event identifier (EventID or MatchingID) or a purpose of use (EventID Source or MatchingID Source) of the corresponding event identifier may be designated in the corresponding event identifier (EventID or MatchingID).

In the present disclosure, a "profile package" may be interchangeably used with a profile or may be used as a term indicating a data object of a specific profile, and may be named a profile TLV or a profile package TLV. If a profile package has been encrypted using an encryption parameter, the profile package may be named a protected profile package (PPP) or a protected profile package TLV (PPP TLV). If a profile package has been encrypted using an encryption parameter which may be decoded using only a specific eUICC, the profile package may be named a bound profile package (BPP) or a bound profile package TLV (BPP TLV). The profile package TLV may be a data set representing information that constitutes a profile in a tag, length, value (TLV) format.

In the present disclosure, "local profile management (LPM)" may be named profile local management, local management, a local management command, a local command, a local profile management package (LPM package), a profile local management package, a local management package, a local management command package, or a local command package. LPM may be used to change a state (enabled, disabled, deleted) of a specific profile and to update contents of a specific profile (e.g., a nickname of a profile (profile nickname) or profile summary information (profile metadata), etc.) through software installed in a terminal, etc. LPM may include one or more local management commands. In this case, a profile, that is, the subject of each local management command, may be the same or different for each local management command.

In the present disclosure, "remote profile management (RPM)" may be named profile remote management, remote management, a remote management command, a remote command, a remote profile management package (RPM package), a profile remote management package, a remote management package, a remote management command package, or a remote command package. RPM may be used to change a state (enabled, disabled, deleted) of a specific profile or to update contents of a specific profile (e.g., a nickname of a profile (profile nickname) or profile summary information (profile metadata), etc.). RPM may include one or more remote management commands. In this case, a profile, that is, the subject of each remote management command, may be the same or different for each remote management command.

In the present disclosure, a "certificate" or a "digital certificate" may indicate a digital certificate used for mutual authentication based on an asymmetric key consisting of a pair of a public key (PK) and a secret key (SK). Each certificate may include one or one or more public keys (PK), a public key ID (PKID) corresponding to each public key, an identifier (certificate issuer ID) of a certificate issuer (CI) that issues a corresponding certificate, and a digital signature.

Furthermore, a "certificate issuer" may be named a certification issuer, a certificate authority (CA), a certification authority, etc.

In the present disclosure, a "public key (PK)" and a "public key ID (PKID)" may be interchangeably used as the same meaning denoting a storage space in which a specific public key or a certificate including a corresponding public key, a part of a specific public key or a part of a certificate including a corresponding public key, a value of results of an operation (e.g., a hash value) of a specific public key or a value of results of an operation (e.g., a hash value) of a certificate including a corresponding public key, or a value of results of an operation (e.g., a hash value) of a part of a specific public key or a value of results of an operation (e.g., a hash value) of a part of a certificate including a corresponding public key, or data is stored.

In the present disclosure, if certificates (primary certificates) issued by one certificate issuer are used to issue another certificate (secondary certificate) or secondary certificates are used to connectionally issue third or more certificates, a correlation between the corresponding certificates may be named a certificate chain or certificate hierarchy. In this case, a CI certificate used to issue a first certificate may be named the root of a certificate, the highest certificate, a root CI, a root CI certificate, a root CA, a root CA certificate, etc.

In the present disclosure, a "mobile service provider" may indicate a company that provides a communication service to a terminal, and may commonly denote all of a business supporting system (BSS), an operational supporting system (OSS), a point of sale (POS) terminal, and other IT systems of a service provider. Furthermore, in the present disclosure, a service provider is not limited to representing only a specific company that provides a communication service, and may be used as a term that denotes a group or association (or consortium) of one or more companies and/or a representative of a corresponding group or association. Furthermore, in the present disclosure, a service provider may be named an operator (or OP or Op.), a mobile network operator (MNO), a mobile virtual network operator (MVNO), a service provider (SP), a profile owner (PO), etc. At least one of a name and/or a unique ID (object identifier: OID) of an provider may be set or assigned to each service provider. If a service provider denotes a group or association or representative of one or more companies, a name or unique ID of the given group or association or representative may be a name or unique ID shared by all companies belonging to the corresponding group or association and/or all companies cooperating with the corresponding representative.

In the present disclosure, an "AKA" may indicate certification and key agreement, and may indicate a certification algorithm for accessing 3GPP and 3GPP2 networks.

In the present disclosure, "K" may be an encryption key value stored in an eUICC used in an AKA certification algorithm.

In the present disclosure, "OPc" is a parameter value which may be stored in an eUICC used in an AKA certification algorithm.

In the present disclosure, an "NAA" is a network access application program, and may be an application program, such as a USIM or an ISIM stored in a UICC and for accessing a network. An NAA may be a network access module.

In the present disclosure, an "indicator" may be used to represent that a given function, setting or operation is necessary or not necessary or may be used to represent a corresponding function, setting or operation itself. Furthermore, in the present disclosure, an indicator may be represented in various forms, such as a character string, an alphanumeric string, an operator indicative of true/false (Boolean—true or false), a bitmap, an array, or a flag. Other expressions having the same meaning may be interchangeably used.

Hereinafter, a method and device for installing and managing an eUICC profile according to the present disclosure are described with reference to FIGS. 1 to 10.

FIG. 1 is a diagram illustrating a method of connecting, by a terminal according to an embodiment of the present disclosure, to a mobile communication network by using a universal integrated circuit card (UICC) on which a fixed profile has been mounted.

As illustrated in FIG. 1, a UICC 120 may be inserted into a terminal 110. For example, the UICC 120 may be a detachable type, and may have been previously embedded in the terminal.

The fixed profile of the UICC on which the fixed profile has been mounted means that "access information" on which a specific communication company may be accessed has been fixed. For example, the access information may be an IMSI, that is, a subscriber delimiter, and a K or Ki value necessary to certificate a network along with the subscriber delimiter.

The terminal 110 according to various embodiments may perform certification along with a certification processing system (e.g., a home location register (HLR) or AuC) of a mobile operator by using the UICC 120. For example, the certification process may be an authentication and key agreement (AKA) process. When succeeding in the certification, the terminal may use a mobile communication service, such as using a telephone or mobile data, by using a mobile communication company network 130 of a mobile communication system.

Figure 2:
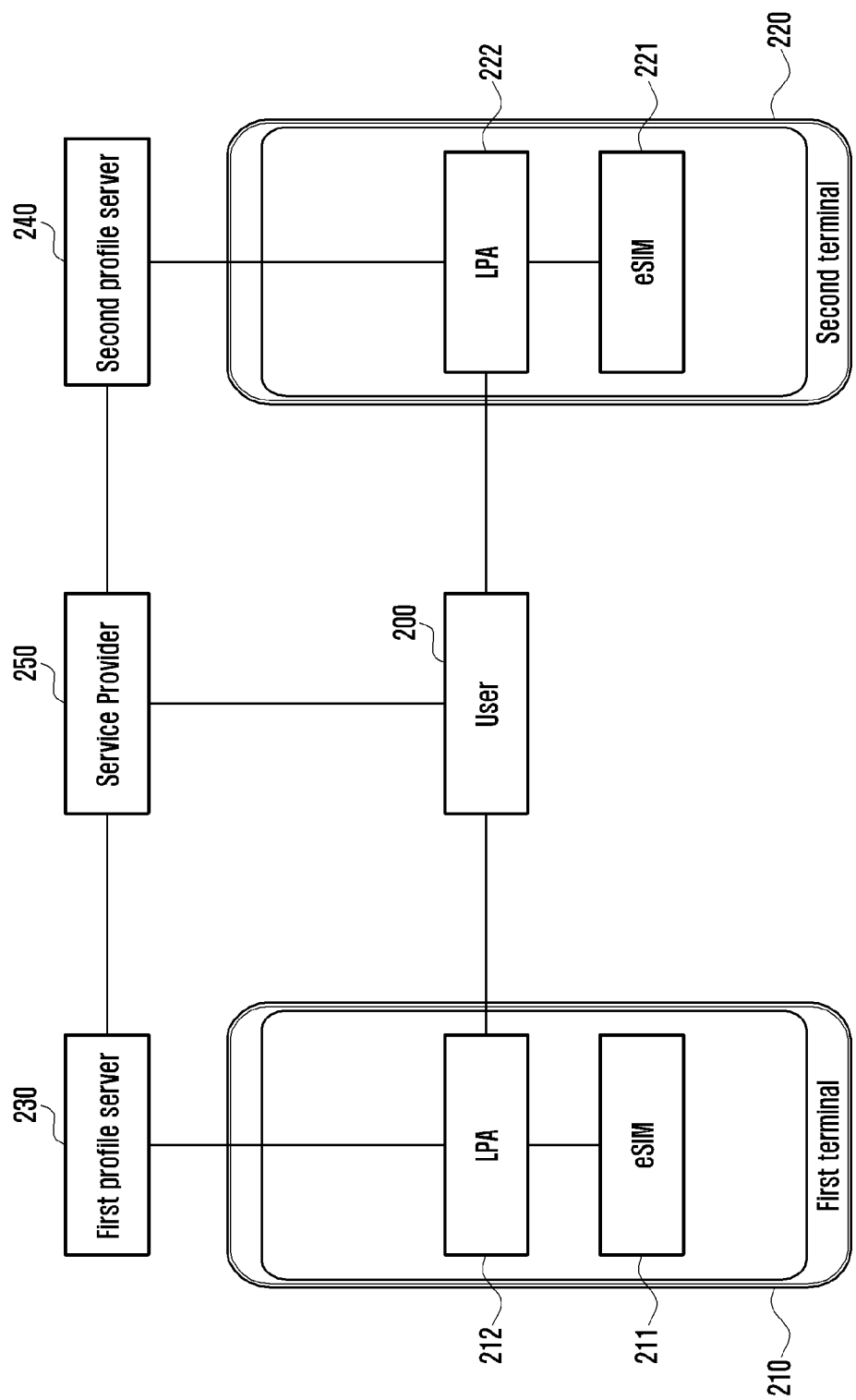
FIG. 2 is a diagram illustrating a configuration of a system in which a terminal according to an embodiment of the present disclosure manages a profile installed in a first terminal and installs the profile in a second terminal in response to a user's input.

FIG. 2 is a diagram illustrating a configuration of a system in which a terminal according to an embodiment of the present disclosure manages a profile installed in a first terminal and installs the profile in a second terminal in response to a user's input.

As illustrated in FIG. 2, eSIMs 211 and 221 have been mounted on terminals 210 and 220, respectively. Profiles (not illustrated) may have been installed in the eSIMs 211 and 221, respectively. Furthermore, LPAs 212 and 222 may have been installed in the terminals 210 and 220, respectively. The eSIMs 211 and 221 may be controlled by the LPAs 212 and 222, respectively. A user 200 may control the profiles installed in the respective eSIMs 211 and 221 of the terminals through the LPAs 212 and 222, respectively.

The user 200 may be provided with a communication service from a service provider (hereinafter referred to as a "service provider") 250. To this end, a profile (not illustrated) of the service provider 250 may have been installed in the first terminal 210. If the user 200 has newly purchased the second terminal 220, for example, the user may attempt to install, in the second terminal 220, the profile installed in the first terminal 210 again.

The service provider 250 may have been coupled to a first profile server 230 and a second profile server 240. The LPA 212 of the first terminal 210 may have been coupled to the first profile server 230. The LPA 222 of the second terminal 220 may have been coupled to the second profile server 240. In this case, the first profile server 230 and the second profile server 240 may be the same or different. Furthermore, if one or more operator servers are included in a configuration, each of the operator servers may have been coupled to each separate profile server, and at least one operator server may have been coupled to the same profile server. Furthermore, FIG. 2 illustrates that each of the profile servers 230 and 240 consists of a single server, for convenience sake. However, according to an implementation and an embodiment, one or more profile servers (SM-DP+) may be included in a server configuration, and one or more discovery relay servers (SM-DS) assisting a connection and generation between a specific profile server and a terminal may be included in a server configuration. As described above, it is to be noted that various configurations of a server may be briefly indicated as a single profile server in the following drawings.

Detailed operations and message exchange procedures of the user 200, the service provider 250, the terminals 210 and 220, the eSIMs 211 and 221, the LPAs 212 and 222, and the profile servers 230 and 240 according to an embodiment of the present disclosure are described in detail with reference to drawings to be described later.

FIG. 3A is a diagram illustrating a procedure of receiving, by the first terminal according to an embodiment of the present disclosure, an activation code through a profile server and downloading a new profile by delivering the activation code to the second terminal.

Reference is made to FIG. 2 for configurations and descriptions of a user 200, a first terminal 210, a second terminal 220, a first profile server 230, a second profile server 240, and a service provider 250 in FIG. 3A. For example, the user 200, the first terminal 210, the second terminal 220, the first profile server 230, the second profile server 240, and the service provider 250 may correspond to the user 200, the first terminal 210, the second terminal 220, the first profile server 230, the second profile server 240, and the service provider 250 in FIG. 2, respectively. Furthermore, the first profile server 230 and the second profile server 240 may be the same server.

Referring to FIG. 3A, in step 301a, the user 200 may request the transfer of a first profile from the first terminal 210. If necessary, the user 200 may confirm, through the first terminal 210, information (profile metadata) on the first profile and information that should be noted by the user attempting to transfer the first profile. Some of or the entire information on the first profile and some of or the entire information that should be noted by the user attempting to transfer the first profile may have been stored in the first terminal 210 or the first profile, and may be subsequently received from the first profile server 230 in step 307a and received from the second profile server 240 in step 313a.

The information on the first profile may include a name or logo, a profile policy, etc. of the service provider 250, for example. The information that should be noted by the user attempting to transfer the first profile may include the number of remained profile transfers permitted by the service provider 250, a cost to be paid by the user for the profile transfer, etc., for example. If the number of remained profile transfers permitted by the service provider 250 has not been left or defined, the first terminal 210 may notify the user that the transfer of the first profile is impossible and terminate the operation, or may further receive a cost to be paid by the user for the transfer of the profile, etc. through the service provider 250 or the profile server 230 or 240 by performing steps 303a to 307a and may notify the user of the cost, etc. Furthermore, at least one address of the profile server that needs to be accessed by the terminal for the transfer of the profile may have been stored in the first terminal 210 or the first profile. The profile server that needs to be accessed by the terminal for the transfer of the profile may be the first profile server 230, for example.

In step 303a, the first terminal 210 may request the transfer of the first profile from the first profile server 230. Step 303a may be performed using at least one of an Initiate Authentication message, a terminal Authenticate Client message, or a transfer request message and/or by further transmitting an operation type set as a device change or a profile transfer, for example. The procedure of requesting the transfer of the first profile in step 303a may include a step of transmitting at least a profile ID (ICCID) of the first profile.

In step 305a, the first profile server 230 and the service provider 250 may check a transfer possibility of the first profile. If the first profile cannot be transferred to another terminal, the first profile server 230 and the service provider 250 may prepare a new second profile. Step 305a may be performed using at least one of a download order message, a Confirm Order message, a remote management order (RPM Order) message, an Release Order message, or Handle Notification, for example. In step 305a, the profile server 230 and the service provider 250 may further generate or change information (profile metadata) on the first profile, information (profile metadata) on the second profile and/or some of or the entire information that should be noted by the user attempting to transfer the first profile, if necessary. The information on the first profile and the information on the second profile may include a name or logo, a profile policy, etc., of the operator 250 that has provided each profile, for example. The information that should be noted by the user attempting to transfer the first profile may include the number of remained profile transfers permitted by the service provider 250, a cost to be paid by the user for the profile transfer, etc., for example. Furthermore, the first profile server 230 and the service provider 250 may further generate an activation code on which the prepared second profile is downloadable. The activation code may include at least an address of the second profile server 240 where the second profile is stored and an event identifier (MatchingID) connected to the second profile. The first profile server 230 and the second profile server 240 have been represented as being separate servers in the drawing, for convenience sake, but the first profile server 230 may be the same server as the second profile server 240. For a more detailed description and another embodiment of step 305a, reference may be made to FIG. 3B.

In step 307a, the first profile server 230 may transfer, to the first terminal 210, the activation code on which the second profile is downloadable, and may further provide notification that the first profile is not required to be deleted. A method of providing notification that the first profile is not required to be deleted may be performed using a method of not transmitting a first Delete Profile flag, not transmitting a first Reuse Profile flag, transmitting a first profile deletion-unnecessary (Do Not Delete Profile) flag or transmitting a new profile use flag, etc., for example. Furthermore, in step 307a, the first profile server 230 may further notify the first terminal 210 of some of or the entire information on the first profile, the entire information (profile metadata) on the second profile and/or the entire information that should be noted by the user attempting to transfer the first profile, if necessary. The information on the first profile or the information on the second profile may include a name or logo, a profile policy, etc., of the service provider 250 that has provided each profile, for example. The information that should be noted by the user attempting to transfer the first profile may include the number of remained profile transfers permitted by the service provider 250, a cost to be paid by the user for the profile transfer, etc., for example. If the first terminal 210 further receives the information on the first profile, the information on the second profile and/or the information that should be noted by the user attempting to transfer the first profile, the first terminal 210 may output some of or the entire information to the user 200, and may receive consent from the user 200.

In step 309a, the first terminal 210 may display the activation code on a screen by converting the activation code in the form of an image, such as a QR code, or in the form of a character string, and may notify the user that the activation code has been prepared. The QR code may be substituted with barcode information, other encryption information, etc.

In step 311a, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 309a.

In step 313a, the second terminal 220 may request the download of the second profile from the second profile server 240. Step 313a may be performed using at least one of an Initiate Authentication message, a terminal Authenticate Client message, or a transfer request message, for example. Step 313a may include a procedure of delivering, by the second terminal 220, an event identifier (MatchingID) included in the activation code to the second profile server 240. In step 313a, the second terminal 200 may use WiFi or an Internet tethering function provided by the first terminal 210 for an Internet connection.

In step 315a, the second profile server 240 may deliver, to the second terminal 220, the information (profile metadata) on the second profile and the information that should be noted by the user who downloads the second profile. The information on the second profile may include a name or logo, a profile policy, etc. of the service provider 250, for example. The information that should be noted by the user who downloads the second profile may include the number of remained profile transfers permitted by the service provider 250, a cost to be paid by the user for the profile transfer, etc., for example.

In step 317a, the user 200 may confirm the information on the second profile and the information that should be noted by the user who downloads the second profile, and may agree on profile installation. The operation of agreeing on the profile installation may include selecting "Yes/No", inputting, by the user 200, a set password, inputting bio information, such as a fingerprint or iris of the user 200, etc.

In step 319a, the second terminal 220 may notify the second profile server 240 that the user 200 has agreed on the profile download, and may request a profile package from the second profile server 240.

In step 321a, the second profile server 240 may deliver the profile package for the second profile to the second terminal 220.

In step 323a, the second terminal 220 may install the second profile by using the profile package for the second profile.

In step 325a, the first terminal 210 may disable and delete the first profile, and may notify the first profile server 230 of the results of the disabling and the results of the deletion. The results of the disabling and results of the deletion of the first profile may include at least a profile ID (ICCID) of the first profile. Step 325a may be performed using a Handle Notification message, for example. Step 325a may be a separate operation not related to that the first profile server 230 has not requested the deletion of the first profile in step 307a, and may be selectively performed, if necessary. Furthermore, FIG. 3A illustrates that the first terminal 210 notifies the first profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the first profile server 230 of the results of the disabling in step 325a may be omitted.

Figure 3B:
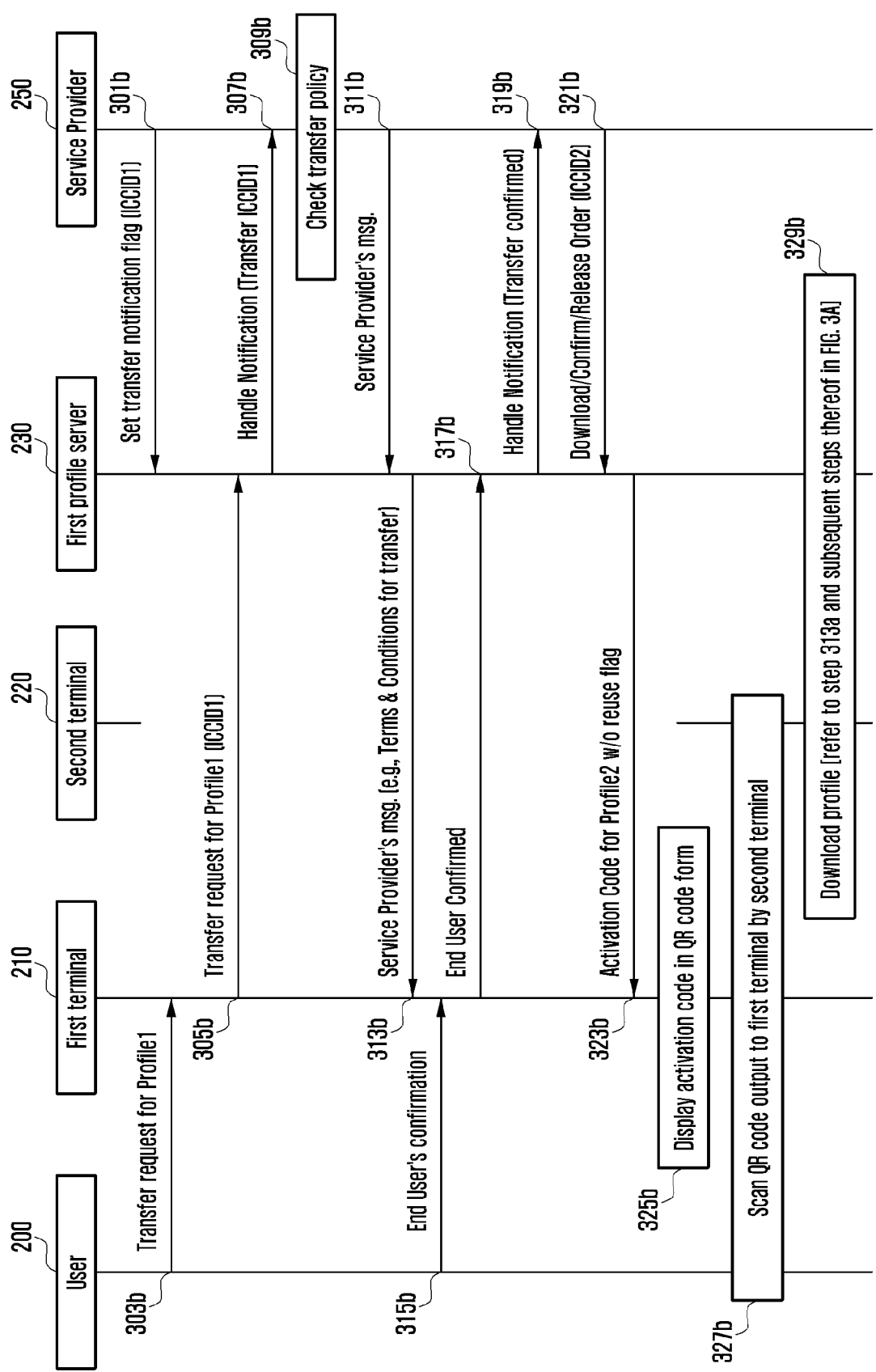
FIG. 3B is a diagram illustrating another procedure of receiving, by the first terminal according to an embodiment of the present disclosure, an activation code through a profile server and downloading a new profile by delivering the activation code to the second terminal.

FIG. 3B is a diagram illustrating another procedure of receiving, by the first terminal according to an embodiment of the present disclosure, an activation code through a profile server and downloading a new profile by delivering the activation code to the second terminal.

For configurations and descriptions of a user 200, a first terminal 210, a second terminal 220, a first profile server 230, a second profile server 240, and a service provider 250 in FIG. 3B, reference is made to FIG. 2. For example, the user 200, the first terminal 210, the second terminal 220, the profile server 230, and the service provider 250 may correspond to the user 200, the first terminal 210, the second terminal 220, the first profile server 230, and the service provider 250 in FIG. 2, respectively.

Referring to FIG. 3B, in step 301b, when a request for the transfer of a first profile is received from the terminal 210 or 220, the service provider 250 may request the profile server 230 to notify the operator 250 of the transfer of the first profile. A method of requesting the profile server 230 to notify the service provider 250 of the transfer of the first profile when the request for the transfer of the first profile is received may be performed using a method, such as transmitting a notification request (Notification Request On Transfer) flag upon transfer or a transfer-available (Transfer Available Without Notification) flag without notification, for example.

In step 303b, the user 200 may request the transfer of the first profile from the first terminal 210. The user 200 may confirm information (profile metadata) on the first profile through the first terminal 210, if necessary. Some of or the entire information on the first profile may have been stored in the first terminal 210 or the first profile. The information on the first profile may include a name or logo, a profile policy, etc. of the service provider 250, for example. Furthermore, at least one address of a profile server that should be accessed by the terminal for the transfer of the profile may have been stored in the first terminal 210 and the first profile. The profile server that should be accessed by the terminal for the transfer of the profile may be the profile server 230, for example.

In step 305b, the first terminal 210 may request the transfer of the first profile from the profile server 230. Step 305b may be performed by using at least one of an Initiate Authentication message, a terminal Authenticate Client message, or a transfer request message and/or by further transmitting an operation type set as a device change or a profile transfer, for example. The procedure of requesting the transfer of the first profile in step 305b may include a step of transmitting at least a profile ID (ICCID) of the first profile.

In step 307b, the profile server 230 may notify the service provider 250 that the request for the transfer of the first profile has been received from the terminal 210. Step 307b may be performed using a Handle Notification message, for example.

In step 309b, the service provider 250 may check a transfer policy for the first profile. For a criterion for permitting the transfer of the first profile, reference may be made to a communication rate system subscribed by the user 200, etc. The service provider 250 may provide additional information to the user 200 for the transfer of the first profile, and may identify that consent from the user 200 needs to be received, if necessary.

In step 311b, the service provider 250 may deliver, to the profile server 230, some of or the entire information that should be noted by the user attempting to transfer the first profile. The information that should be noted by the user attempting to transfer the first profile may include the number of remained profile transfers permitted by the service provider 250, a cost to be paid by the user for the profile transfer, etc., for example. In step 311b, the profile server 230 and the service provider 250 may further generate or change some of or the entire information (profile metadata) on the first profile, the entire information (profile metadata) on a second profile and/or the entire information that should be noted by the user attempting to transfer the first profile, if necessary. The information on the first profile or the information on the second profile may include a name or logo, a profile policy, etc., of the service provider 250 that has provided each profile, for example. The information that should be noted by the user attempting to transfer the first profile may include the number of remained profile transfers permitted by the service provider 250, a cost to be paid by the user for the profile transfer, etc., for example.

In step 313b, the profile server 230 may deliver, to the first terminal 210, some of or the entire information that should be noted by the user attempting to transfer the first profile. The first terminal 210 may show some of or the entire received information to the user 200.

In step 315b, the user 200 may confirm the information for transferring the first profile which is presented by the service provider 250, and may input user consent to the first terminal 210.

In step 317b, the first terminal 210 may deliver, to the profile server 230, that the user has agreed on the transfer of the first profile. Step 317b may be performed by using at least one of an Initiate Authentication message, a terminal Authenticate Client message, or a transfer request message and/or by further transmitting an operation type set as Device Change Confirmed, Transfer Profile Confirmed or End User Confirmed, for example. The procedure of delivering that the user has agreed on the transfer of the first profile in step 317b may include a step of transmitting at least a profile ID (ICCID) of the first profile.

In step 319b, the profile server 230 may notify the service provider 250 that the user has agreed on the transfer of the first profile. Step 319b may be performed using a Handle Notification message, for example.

In step 321b, the profile server 230 and the service provider 250 may prepare a new second profile. Step 321b may be performed using at least one of a download order message, an Confirm Order message, a remote management order (RPM Order) message, an Release Order message, or Handle Notification, for example. Furthermore, the profile server 230 and the service provider 250 may further generate an activation code on which the prepared second profile is downloadable. The activation code may include at least an address of the profile server 230 where the second profile is stored and an event identifier (MatchingID) connected to the second profile.

In step 323b, the profile server 230 may deliver, to the first terminal 210, the activation code on which the second profile is downloadable, and may further provide notification that the first profile is not required to be deleted. A method of providing notification that the first profile is not required to be deleted may be performed using a method, such as not transmitting a first Delete Profile flag, not transmitting a first Reuse Profile flag, transmitting a first profile deletion-unnecessary (Do Not Delete Profile) flag or transmitting a new profile use flag, for example.

In step 325b, the first terminal 210 may display the activation code on a screen by converting the activation code in the form of an image, such as a QR code, or in the form of a character string, and may notify the user that the activation code has been prepared. The QR code may be substituted with barcode information, other encryption information, etc.

In step 327b, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 327b.

In step 329b, the second terminal 220 may download the second profile from the profile server 230. For a detailed description of step 329b, reference is made to the description of step 313a and subsequent steps thereof in FIG. 3A.

FIG. 4A is a diagram illustrating a procedure of receiving, by the first terminal according to an embodiment of the present disclosure, an activation code through a profile server and downloading the same profile again by delivering the activation code to the second terminal.

For configurations and descriptions of a user 200, a first terminal 210, a second terminal 220, a profile server 230, and a service provider 250 in FIG. 4A, reference is made to FIG. 2. For example, the user 200, the first terminal 210, the second terminal 220, the profile server 230, and the service provider 250 may correspond to the user 200, the first terminal 210, the second terminal 220, the first profile server 230, and the service provider 250 in FIG. 2, respectively.

Referring to FIG. 4A, in step 401a, the user 200 may request the transfer of a first profile from the first terminal 210. To this end, the user 200 may confirm, through the first terminal 210, information (profile metadata) on the first profile and information that should be noted by the user attempting to transfer the first profile. The information on the first profile and the information that should be noted by the user attempting to transfer the first profile may have been stored in the first terminal 210 or the first profile. The information on the first profile may include a name or logo, a profile policy, etc. of the service provider 250, for example. The information that should be noted by the user attempting to transfer the first profile may include the number of remained profile transfers permitted by the service provider 250, a cost to be paid by the user for the profile transfer, etc., for example. Furthermore, at least one address of the profile server that should be accessed by the terminal for the transfer of the profile may have been stored in the first terminal 210 or the first profile. The profile server that should be accessed by the terminal for the transfer of the profile may be the profile server 230, for example.

In step 403a, the first terminal 210 may request the transfer of the first profile from the profile server 230. Step 403a may be performed by using at least one of an Initiate Authentication message, a terminal Authenticate Client message, or a transfer request message and/or by further transmitting an operation type set as a device change or a profile transfer, for example. The procedure of requesting the transfer of the first profile in step 403a may include a step of transmitting at least a profile ID (ICCID) of the first profile.

In step 405a, the profile server 230 and the operator 250 may check the transfer possibility of the first profile. If the first profile can be transferred to another terminal, the profile server 230 and the service provider 250 may prepare the reuse of the first profile. In this case, a state of the prepared first profile may be set as a state in which download is not yet possible in order to prevent the first profile from being duplicated. Step 405a may be performed using at least one of a download order message, an Confirm Order message, a remote management order (RPM Order) message, an Release Order message, or Handle Notification, for example. In step 405a, the profile server 230 and the service provider 250 may further generate or change some of or the entire information (profile metadata) on the first profile and/or the entire information that should be noted by the user attempting to transfer the first profile, if necessary. The information on the first profile may include a name or logo, a profile policy, etc. of the service provider 250, for example. The information that should be noted by the user attempting to transfer the first profile may include the number of remained profile transfers permitted by the service provider 250, a cost to be paid by the user for the profile transfer, etc., for example. Furthermore, the profile server 230 and the service provider 250 may further generate an activation code on which the first profile is downloadable again. The activation code may include at least an address of the profile server 240 where the first profile is stored and an event identifier (MatchingID) connected to the first profile. In this drawing, the first profile has been represented as being stored in the profile server 230, for convenience sake, but the first profile may be stored in a profile server different from the profile server 230. For example, the second profile server 240 in FIG. 3A may be used.

In step 407a, the profile server 230 may deliver, to the first terminal 210, the activation code on which the first profile is downloadable again, and may further provide notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example. Furthermore, in step 407a, the first profile server 230 may further notify the first terminal 210 of some of or the entire information (profile metadata) on the second profile and/or the entire information that should be noted by the user who downloads the second profile, if necessary. When further receiving the information on the second profile and/or the information that should be noted by the user who downloads the second profile, the first terminal 210 may output some of or the entire information to the user 200, and may receive consent from the user 200.

In step 409a, the first terminal 210 may disable and delete the first profile in response to the request from the profile server 230, and may notify the profile server 230 of the results of the disabling and the results of the deletion. The results of the disabling and results of the deletion of the first profile may include at least a profile ID (ICCID) of the first profile. Step 409a may be performed using at least one of a Disable Profile message, a Delete Profile message, or a Handle Notification message, for example. Furthermore, FIG. 4A illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 409a may be omitted.

In step 411a, the profile server 230 may identify that the first terminal 210 had deleted the first profile, and may set, as a downloadable state, a state of the first profile prepared in step 405a. Furthermore, the profile server 230 may notify the first terminal 210 that the state of the first profile is the downloadable state.

In step 413a, the first terminal 210 may display the activation code on a screen by converting the activation code in the form of an image, such as a QR code, or in the form of a character string, and may notify the user that the activation code has been prepared.

In step 415a, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 413a.

In step 417a, the second terminal 220 may request the download of the first profile from the profile server 230. Step 417a may be performed using at least one of an Initiate Authentication message, a terminal Authenticate Client message, or a transfer request message, for example. Step 417a may include a procedure of delivering, by the second terminal 220, an event identifier (MatchingID) included in the activation code to the profile server 230. In step 417a, the second terminal 200 may use WiFi or an Internet tethering function provided by the first terminal 210 for an Internet connection.

In step 419a, the profile server 230 may first identify whether a state of the first profile is a downloadable state. If a state of the first profile is a download-impossible state because the profile server 230 has not identified that the first profile has been deleted from the first terminal through steps 409a to 411a, the profile server 230 may transmit an error code as a response and terminate the operation. When the state of the first profile is a downloadable state, the profile server 230 may deliver, to the second terminal 220, the information (profile metadata) on the first profile and the information that should be noted by the user who downloads the first profile. The information on the first profile may include a name or logo, a profile policy, etc. of the operator 250, for example. The information that should be noted by the user who downloads the first profile may include the number of remained profile transfers permitted by the operator 250, a cost to be paid by the user for the profile transfer, etc., for example.

In step 421a, the user 200 may confirm the information on the first profile and the information that should be noted by the user who downloads the first profile, and may agree on profile installation. The operation of agreeing on the profile installation may include an operation of selecting "Yes/No", inputting, by the user 200, a set password, inputting bio information, such as a fingerprint or iris of the user 200, etc.

In step 423a, the second terminal 220 may notify the profile server 230 that the user 200 has agreed on the profile download, and may request a profile package from the profile server 230.

In step 425a, the profile server 230 may deliver the profile package for the first profile to the second terminal 220.

In step 427a, the second terminal 220 may install the first profile by using the profile package for the first profile.

FIG. 4B is a diagram illustrating another procedure of receiving, by the first terminal according to an embodiment of the present disclosure, an activation code through a profile server and downloading a new profile by delivering the activation code to the second terminal.

For configurations and descriptions of a user 200, a first terminal 210, a second terminal 220, a profile server 230, and a service provider 250 in FIG. 4B, reference is made to FIG. 2. For example, the user 200, the first terminal 210, the second terminal 220, the profile server 230, and the operator 250 may correspond to the user 200, the first terminal 210, the second terminal 220, the first profile server 230, and the operator 250 in FIG. 2, respectively.

Referring to FIG. 4B, in step 401b, when a request for the transfer of a first profile is received from the terminal 210 or 220, the operator 250 may request the profile server 230 to notify the service provider 250 of the transfer of the first profile. A method of requesting the profile server 230 to notify the service provider 250 of the transfer of the first profile when the request for the transfer of the first profile is received, may be performed using a method, such as transmitting a notification request (Notification Request On Transfer) flag upon transfer or transmitting a transfer-available (Transfer Available Without Notification) flag without notification, for example.

In step 403b, the user 200 may request the transfer of the first profile from the first terminal 210. The user 200 may confirm information (profile metadata) on the first profile through the first terminal 210, if necessary. Some of or the entire information on the first profile may have been stored in the first terminal 210 or the first profile. The information on the first profile may include a name or logo, a profile policy, etc. of the operator 250, for example. Furthermore, at least one address of the profile server that should be accessed by the terminal for the transfer of the profile may have been stored in the first terminal 210 or the first profile. The profile server that should be accessed by the terminal for the transfer of the profile may be the profile server 230, for example.

In step 405b, the first terminal 210 may request the transfer of the first profile from the profile server 230. Step 405b may be performed by using at least one of an Initiate Authentication message, a terminal Authenticate Client message, or a transfer request message and/or by further transmitting an operation type set as a device change or a profile transfer, for example. The procedure of requesting the transfer of the first profile in step 405b may include a step of transmitting at least a profile ID (ICCID) of the first profile.

In step 407b, the profile server 230 may notify the operator 250 that the request for the transfer of the first profile has been received from the terminal 210. Step 407b may be performed using a Handle Notification message, for example.

In step 409b, the operator 250 may check a transfer policy for the first profile. For a criterion for permitting the transfer of the first profile, reference may be made to a communication rate system subscribed by the user 200, etc., for example. The service provider 250 may provide additional information to the user 200 for the transfer of the first profile and determine that consent from the user 200 needs to be received, if necessary.

In step 411b, the service provider 250 may deliver, to the profile server 230, some of or the entire information that should be noted by the user attempting to transfer the first profile, and may further provide notification that that the first profile is required to be first deleted. The information that should be noted by the user attempting to transfer the first profile may include the number of remained profile transfers permitted by the service provider 250, a cost to be paid by the user for the profile transfer, etc., for example. In step 411b, the profile server 230 and the operator 250 may further generate or change some of or the entire information (profile metadata) on the first profile and/or the entire information that should be noted by the user attempting to transfer the first profile, if necessary. The information on the first profile may include a name or logo, a profile policy, etc., of the service provider 250 that has provided the first profile, for example. The information that should be noted by the user attempting to transfer the first profile may include the number of remained profile transfers permitted by the service provider 250, a cost to be paid by the user for the profile transfer, etc., for example. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example.

In step 413b, the profile server 230 may deliver, to the first terminal 210, some of or the entire information that should be noted by the user attempting to transfer the first profile. The first terminal 210 may show some of or the entire received information to the user 200.

In step 415b, the user 200 may confirm the information for transferring the first profile which is presented by the operator 250, and may input user consent to the first terminal 210.

In step 417b, the first terminal 210 may deliver, to the profile server 230, that the user has agreed on the transfer of the first profile. Step 417b may be performed by using at least one of an Initiate Authentication message, a terminal Authenticate Client message, or a transfer request message and/or by further transmitting an operation type set as Device Change Confirmed, Transfer Profile Confirmed or End User Confirmed, for example. The procedure of delivering that the user has agreed on the transfer of the first profile in step 417b may include a step of transmitting at least a profile ID (ICCID) of the first profile.

In step 419b, the profile server 230 may notify the operator 250 that that the user has agreed on the transfer of the first profile. Step 419b may be performed using a Handle Notification message, for example.

In step 421b, the profile server 230 and the operator 250 may prepare the reuse of the first profile. Step 421b may be performed using at least one of a download order message, an Confirm Order message, a remote management order (RPM Order) message, or Handle Notification, for example, and may be performed by further providing notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example. Furthermore, the profile server 230 and the operator 250 may further generate an activation code on which the prepared first profile is downloadable. The activation code may include at least an address of the profile server 230 where the first profile is stored and an event identifier (MatchingID) connected to the first profile.

In step 423b, the profile server 230 may deliver, to the first terminal 210, the activation code on which the first profile is downloadable, and may further provide notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example.

In step 425b, the first terminal 210 may disable and delete the first profile in response to the request from the profile server 230, and may notify the profile server 230 of the results of the disabling and the results of the deletion. The results of the disabling and results of the deletion of the first profile may include at least a profile ID (ICCID) of the first profile. Step 425b may be performed using at least one of a Disable Profile message, a Delete Profile message, or a Handle Notification message, for example. Furthermore, FIG. 4B illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 425b may be omitted.

In step 427b, the profile server 230 may notify the service provider 250 that the first profile has been deleted from the first terminal 210. Step 427b may be performed using a Handle Notification message, for example. Step 427b may include a procedure of delivering at least an ID (ICCID) of the first profile.

In step 429b, the service provider 250 may request the profile server 230 to change a state of the first profile into an available state. Step 429b may be performed using an Release Order message, for example.

In step 431b, the profile server 230 may set, as a downloadable state, a state of the first profile prepared in step 421b in response to the request from the service provider 250. Furthermore, the profile server 230 may notify the first terminal 210 that the state of the first profile is the downloadable state.

In step 433b, the first terminal 210 may display the activation code on a screen by converting the activation code in the form of an image, such as a QR code, or in the form of a character string, and may notify the user that the activation code has been prepared. The QR code may be substituted with barcode information, other encryption information, etc.

In step 435b, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 423b.

In step 437b, the second terminal 220 may download the first profile from the profile server 230. For a detailed description of step 437b, reference is made to the descriptions of step 417a and subsequent steps thereof in FIG. 4A.

FIG. 4C is a diagram illustrating still another procedure of receiving, by the first terminal according to an embodiment of the present disclosure, an activation code through a profile server and downloading a new profile by delivering the activation code to the second terminal.

For configurations and descriptions of a user 200, a first terminal 210, a second terminal 220, a profile server 230, and a service provider 250 in FIG. 4C, reference is made to FIG. 2. For example, the user 200, the first terminal 210, the second terminal 220, the profile server 230, and the service provider 250 may correspond to the user 200, the first terminal 210, the second terminal 220, the first profile server 230, and the service provider 250 in FIG. 2, respectively.

Referring to FIG. 4C, in step 401c, when a request for the transfer of a first profile is received from the terminal 210 or 220, the service provider 250 may request the profile server 230 to notify the service provider 250 of the transfer of the first profile. A method of requesting the profile server 230 to notify the service provider 250 of the transfer of the first profile when the request for the transfer of the first profile is received may be performed using a method, such as transmitting a notification request (Notification Request On Transfer) flag upon transfer or transmitting a transfer-available (Transfer Available Without Notification) flag without notification, for example.

In step 403c, the user 200 may request the transfer of the first profile from the first terminal 210. The user 200 may confirm the information (profile metadata) on the first profile through the first terminal 210, if necessary. Some of or the entire information on the first profile may have been stored in the first terminal 210 or the first profile. The information on the first profile may include a name or logo, a profile policy, etc. of the service provider 250, for example. Furthermore, at least one address of the profile server that should be accessed by the terminal for the transfer of the profile may have been stored in the first terminal 210 or the first profile. The profile server that should be accessed by the terminal for the transfer of the profile may be the profile server 230, for example.

In step 405c, the first terminal 210 may request the transfer of the first profile from the profile server 230. Step 405c may be performed by using at least one of an Initiate Authentication message, a terminal Authenticate Client message, or a transfer request message and/or by further transmitting an operation type set as a device change or a profile transfer, for example. The procedure of requesting the transfer of the first profile in step 405c may include a step of transmitting at least a profile ID (ICCID) of the first profile.

In step 407c, the profile server 230 may notify the service provider 250 that the request for the transfer of the first profile has been received from the terminal 210. Step 407c may be performed using a Handle Notification message, for example.

In step 409c, the service provider 250 may check a transfer policy for the first profile. For a criterion for permitting the transfer of the first profile, reference may be made to a communication rate system subscribed by the user 200, etc., for example. The service provider 250 may provide additional information to the user 200 for the transfer of the first profile and may identify that consent from the user 200 needs to be received, if necessary.

In step 411c, the service provider 250 may deliver, to the profile server 230, some of or the entire information that should be noted by the user attempting to transfer the first profile. The information that should be noted by the user attempting to transfer the first profile may include the number of remained profile transfers permitted by the service provider 250, a cost to be paid by the user for the profile transfer, etc., for example. In step 411c, the profile server 230 and the service provider 250 may further generate or change some of or the entire information (profile metadata) on the first profile and/or the entire information that should be noted by the user attempting to transfer the first profile, if necessary. The information on the first profile may include a name or logo, a profile policy, etc., of the service provider 250 that has provided the first profile, for example. The information that should be noted by the user attempting to transfer the first profile may include the number of remained profile transfers permitted by the service provider 250, a cost to be paid by the user for the profile transfer, etc., for example.

In step 413c, the profile server 230 may deliver, to the first terminal 210, some of or the entire information that should be noted by the user attempting to transfer the first profile. The first terminal 210 may show some of or the entire received information to the user 200.

In step 415c, the user 200 may confirm the information for transferring the first profile which is presented by the service provider 250, and may input user consent to the first terminal 210.

In step 417c, the first terminal 210 may deliver, to the profile server 230, that the user has agreed on the transfer of the first profile. Step 417c may be performed by using at least one of an Initiate Authentication message, a terminal Authenticate Client message, or a transfer request message and/or by further transmitting an operation type set as Device Change Confirmed, Transfer Profile Confirmed or End User Confirmed, for example. The procedure of delivering that the user has agreed on the transfer of the first profile in step 417c may include a step of transmitting at least a profile ID (ICCID) of the first profile.

In step 419c, the profile server 230 may notify the service provider 250 that the user has agreed on the transfer of the first profile. Step 419c may be performed using a Handle Notification message, for example.

In step 421c, the profile server 230 and the service provider 250 may prepare the reuse of the first profile. Step 421c may be performed using at least one of a download order message, an Confirm Order message, a remote management order (RPM Order) message, an Release Order message, or Handle Notification, for example, and may be performed by further providing notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example. Furthermore, the profile server 230 and the service provider 250 may further generate an activation code on which the prepared first profile is downloadable. The activation code may include at least an address of the profile server 230 where the first profile is stored and an event identifier (MatchingID) connected to the first profile.

In step 423c, the profile server 230 may deliver, to the first terminal 210, the activation code on which the first profile is downloadable, and may further provide notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example.

In step 425c, the first terminal 210 may disable and delete the first profile in response to the request from the profile server 230, and may notify the profile server 230 of the results of the disabling and the results of the deletion. The results of the disabling and results of the deletion of the first profile may include at least a profile ID (ICCID) of the first profile. Step 425c may be performed using at least one of a Disable Profile message, a Delete Profile message, or a Handle Notification message, for example. Furthermore, FIG. 4C illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 425*c* may be omitted.

In step 427*c*, the profile server 230 may identify that the first terminal 210 had deleted the first profile, and may set, as a downloadable state, a state of the first profile prepared in step 421*c*. Furthermore, the profile server 230 may notify the first terminal 210 that the state of the first profile is the downloadable state.

In step 429*c*, the profile server 230 may notify the service provider 250 that the first profile has been deleted from the first terminal 210 and profile transfer has been prepared. Step 427*c* may be performed using a Handle Notification message, for example. Step 427*c* may include a procedure of delivering at least an ID (ICCID) of the first profile.

In step 433*c*, the first terminal 210 may display the activation code on a screen by converting the activation code in the form of an image, such as a QR code, or in the form of a character string, and may notify the user that the activation code has been prepared. The QR code may be substituted with barcode information, other encryption information, etc.

In step 435*c*, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 423*c*.

In step 437*c*, the second terminal 220 may download the first profile from the profile server 230. For a detailed description of step 437*c*, reference is made to the descriptions of step 417*a* and subsequent steps thereof in FIG. 4A.

FIG. 4D is a diagram illustrating still another procedure of receiving, by the first terminal according to an embodiment of the present disclosure, an activation code through a profile server and downloading a new profile by delivering the activation code to the second terminal.

For configurations and descriptions of a user 200, a first terminal 210, a second terminal 220, a first profile server 230, and a service provider 250 in FIG. 4D, reference is made to FIG. 2. For example, the user 200, the first terminal 210, the second terminal 220, the profile server 230, and the service provider 250 may correspond to the user 200, the first terminal 210, the second terminal 220, the first profile server 230, and the service provider 250 in FIG. 2, respectively.

Referring to FIG. 4D, in step 401*d*, when a request for the transfer of a first profile is received from the terminal 210 or 220, the service provider 250 may request the profile server 230 to notify the service provider 250 of the transfer of the first profile. A method of requesting the profile server 230 to notify the service provider 250 of the transfer of the first profile when the request for the transfer of the first profile is received may be performed using a method, such as transmitting a notification request (Notification Request On Transfer) flag upon transfer or transmitting a transfer-available (Transfer Available Without Notification) flag without notification, for example.

In step 403*d*, the user 200 may request the transfer of the first profile from the first terminal 210. The user 200 may confirm information (profile metadata) on the first profile through the first terminal 210, if necessary. Some of or the entire information on the first profile may have been stored in the first terminal 210 or the first profile. The information on the first profile may include a name or logo, a profile policy, etc. of the service provider 250, for example. Furthermore, at least one address of a profile server that should be accessed by a terminal for the transfer of the profile may have been stored in the first terminal 210 or the first profile. The profile server that should be accessed by the terminal for the transfer of the profile may be the profile server 230, for example.

In step 405*d*, the first terminal 210 may request the transfer of the first profile from the profile server 230. Step 405*d* may be performed by using at least one of an Initiate Authentication message, a terminal Authenticate Client message, or a transfer request message and/or by further transmitting an operation type set as a device change or a profile transfer, for example. The procedure of requesting the transfer of the first profile in step 405*d* may include a step of transmitting at least a profile ID (ICCID) of the first profile.

In step 407*d*, the profile server 230 may notify the service provider 250 that the request for the transfer of the first profile has been received from the terminal 210. Step 407*d* may be performed using a Handle Notification message, for example.

In step 409*d*, the operator 250 may check a transfer policy for the first profile. For a criterion for permitting the transfer of the first profile, reference may be made to a communication rate system subscribed by the user 200, etc., for example. The service provider 250 may provide additional information to the user 200 for the transfer of the first profile and may identify that consent from the user 200 needs to be received, if necessary.

In step 411*d*, the service provider 250 may deliver, to the profile server 230, some of or the entire information that should be noted by the user attempting to transfer the first profile. The information that should be noted by the user attempting to transfer the first profile may include the number of remained profile transfers permitted by the service provider 250, a cost to be paid by the user for the profile transfer, etc., for example. In step 411*d*, the profile server 230 and the service provider 250 may further generate or change some of or the entire information (profile metadata) on the first profile and/or the entire information that should be noted by the user attempting to transfer the first profile, if necessary. The information on the first profile may include a name or logo, a profile policy, etc. of the operator 250 that has provided the first profile, for example. The information that should be noted by the user attempting to transfer the first profile may include the number of remained profile transfers permitted by the service provider 250, a cost to be paid by the user for the profile transfer, etc., for example.

In step 413*d*, the profile server 230 may deliver, to the first terminal 210, some of or the entire information that should be noted by the user attempting to transfer the first profile, and may further provide notification that the first profile is required to be deleted. A method of providing notification that the first profile is required to be deleted may be performed using a method, such as transmitting a first Delete Profile flag, transmitting a first Reuse Profile flag, not transmitting a first profile deletion-unnecessary (Do Not Delete Profile) flag, or not transmitting a new profile use flag, for example. The first terminal 210 may show some of or the entire received information to the user 200.

In step 415d, the user 200 may confirm the information for transferring the first profile which is presented by the service provider 250, and may input user consent to the first terminal 210.

In step 417d, the first terminal 210 may disable and delete the first profile in response to the request from the profile server 230, and may notify the profile server 230 of the results of the disabling and the results of the deletion. The results of the disabling and results of the deletion of the first profile may include at least a profile ID (ICCID) of the first profile. Step 417d may be performed using at least one of a Disable Profile message, a Delete Profile message, or a Handle Notification message, for example. Furthermore, FIG. 4D illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 417d may be omitted. Step 417d may include a procedure of delivering, by the first terminal 210, that the user has agreed on the transfer of the first profile to the profile server 230. Step 417d may be performed by using at least one of an Initiate Authentication message, a terminal Authenticate Client message, a transfer request message, or a Handle Notification message and/or by further transmitting an operation type set as Device Change Confirmed, Transfer Profile Confirmed or End User Confirmed, for example. The procedure of delivering that the user has agreed on the transfer of the first profile in step 417d may include a step of transmitting at least a profile ID (ICCID) of the first profile.

In step 419d, the profile server 230 may notify the service provider 250 that the user has agreed on the transfer of the first profile. Step 419d may be performed using a Handle Notification message, for example.

In step 421d, the profile server 230 and the operator 250 may prepare the reuse of the first profile. Step 421d may be performed using at least one of a download order message, an Confirm Order message, a remote management order (RPM Order) message, an Release Order message, Handle Notification, for example. Furthermore, the profile server 230 and the service provider 250 may further generate an activation code on which the first profile prepared to be reused is downloadable. The activation code may include at least an address of the profile server 230 where the first profile is stored and an event identifier (MatchingID) connected to the first profile.

In step 423d, the profile server 230 may identify that the first terminal 210 had deleted the first profile, and may set, as a downloadable state, a state of the first profile prepared in step 421d. Furthermore, the profile server 230 may notify the first terminal 210 that the state of the first profile is the downloadable state by delivering, to the first terminal 210, the activation code on which the first profile is downloadable.

In step 425d, the profile server 230 may notify the service provider 250 that the first profile has been deleted from the first terminal 210 and profile transfer has been prepared. Step 425d may be performed using a Handle Notification message, for example. Step 425d may include a procedure of delivering at least an ID (ICCID) of the first profile.

In step 433d, the first terminal 210 may display the activation code on a screen by converting the activation code in the form of an image, such as a QR code, or in the form of a character string, and may notify the user that the activation code has been prepared. The QR code may be substituted with barcode information, other encryption information, etc.

In step 435d, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 423d.

In step 437d, the second terminal 220 may download the first profile from the profile server 230. For a detailed description of step 437d, reference is made to the descriptions of step 417a and subsequent steps thereof in FIG. 4A.

Figure 5:
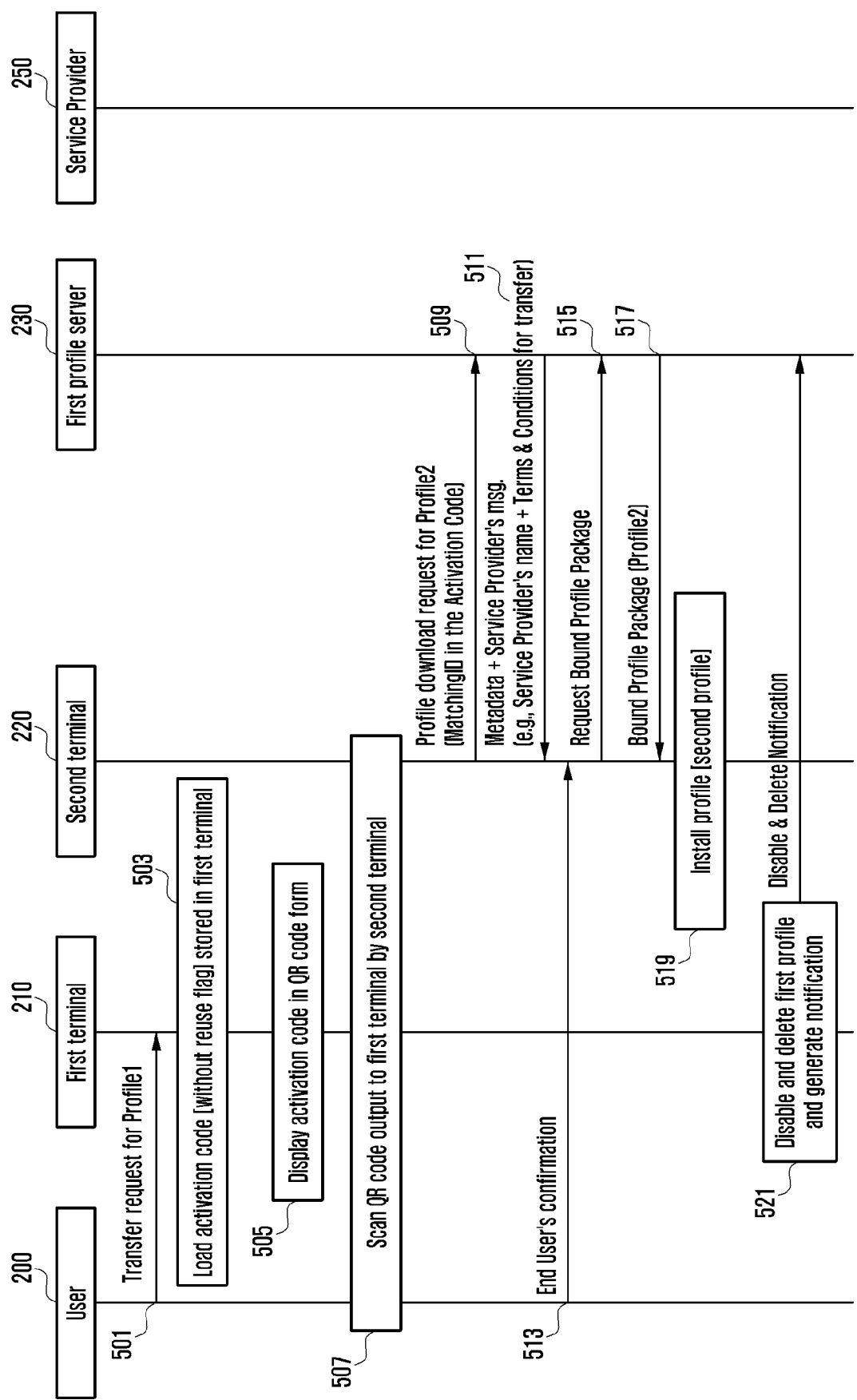
FIG. 5 is a diagram illustrating a procedure of downloading, by the first terminal according to an embodiment of the present disclosure, a new profile by transmitting, to the second terminal, an activation code stored in the first terminal.

FIG. 5 is a diagram illustrating a procedure of downloading, by the first terminal according to an embodiment of the present disclosure, a new profile by transmitting, to the second terminal, an activation code stored in the first terminal.

For configurations and descriptions of a user 200, a first terminal 210, a second terminal 220, a profile server 230, and a service provider 250 in FIG. 5, reference is made to FIG. 2. For example, the user 200, the first terminal 210, the second terminal 220, the profile server 230, and the service provider 250 may correspond to the user 200, the first terminal 210, the second terminal 220, the first profile server 230, and the operator 250 in FIG. 2, respectively.

Referring to FIG. 5, in step 501, the user 200 may request the transfer of a first profile from the first terminal 210. To this end, the user 200 may confirm, through the first terminal 210, information (profile metadata) on the first profile and information that should be noted by the user attempting to transfer the first profile. The information on the first profile and the information that should be noted by the user attempting to transfer the first profile may have been stored in the first terminal 210 or the first profile. The information on the first profile may include a name or logo, a profile policy, etc. of the service provider 250, for example. The information that should be noted by the user attempting to transfer the first profile may include the number of remained profile transfers permitted by the service provider 250, a cost to be paid by the user for the profile transfer, etc., for example. Furthermore, an activation code that needs to be used by the terminal for the transfer of the first profile and information indicating that the first profile is not required to be deleted for the transfer of the profile may have been stored in the first terminal 210 or the first profile. The activation code that needs to be used by the terminal for the transfer of the first profile may be an activation code used to install the first profile in the first terminal in the past, for example. The information indicating that the first profile is not required to be deleted for the transfer of the profile may be represented using a method, such as that a first Delete Profile flag has not been set, a first Reuse Profile flag has not been set, a first profile deletion-unnecessary (Do Not Delete Profile) flag has been set or a new profile use flag has been set, etc., for example.

In step 503, the first terminal 210 may invoke the activation code that is stored in the first terminal 210 or the first profile and that needs to be used by the terminal for the transfer of the first profile. The activation code may include at least an address of the profile server 230 where a second profile is stored and an event identifier (MatchingID) connected to the second profile.

In step 505, the first terminal 210 may display the activation code on a screen by converting the activation code in the form of an image, such as a QR code, or in the form of a character string, and may notify the user that the activation code has been prepared.

In step 507, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 507.

In step 509, the second terminal 220 may request the download of the second profile from the profile server 230. Step 509 may be performed using at least one of an Initiate Authentication message, a terminal Authenticate Client message, or a transfer request message, for example. Step 509 may include a procedure of delivering, by the second terminal 220, an event identifier (MatchingID) included in the activation code to the profile server 230. In step 509, the second terminal 200 may use WiFi for an Internet connection or may use an Internet tethering function provided by the first terminal 210.

In step 511, the profile server 230 may deliver, to the second terminal 220, information (profile metadata) on the second profile and the information that should be noted by the user who downloads the second profile. The information on the second profile may include a name or logo, a profile policy, etc. of the service provider 250, for example. The information that should be noted by the user who downloads the second profile may include the number of remained profile transfers permitted by the service provider 250, a cost to be paid by the user for the profile transfer, etc., for example.

In step 513, the user 200 may confirm the information on the second profile and the information that should be noted by the user who downloads the second profile, and may agree on profile installation. The operation of agreeing on the profile installation may include an operation of selecting "Yes/No", inputting, by the user 200, a set password, inputting bio information, such as a fingerprint or iris of the user 200, etc.

In step 515, the second terminal 220 may notify the profile server 230 that the user 200 has agreed on the profile download, and may request a profile package.

In step 517, the profile server 230 may deliver, to the second terminal 220, the profile package for the second profile.

In step 519, the second terminal 220 may install the second profile by using the profile package for the second profile.

In step 521, the first terminal 210 may disable and delete the first profile, and may notify the profile server 230 of the results of the disabling and the results of the deletion. The results of the disabling and results of the deletion of the first profile may include at least a profile ID (ICCID) of the first profile. Step 521 may be performed using at least one of a Disable Profile message, a Delete Profile message, or a Handle Notification message, for example. Step 521 may be a separate operation not related to that the first terminal 210 has checked that the first profile is not required to be deleted in step 503, and may be selectively performed, if necessary. Furthermore, FIG. 5 illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 in FIG. 3A or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 521 may be omitted.

Figure 6:
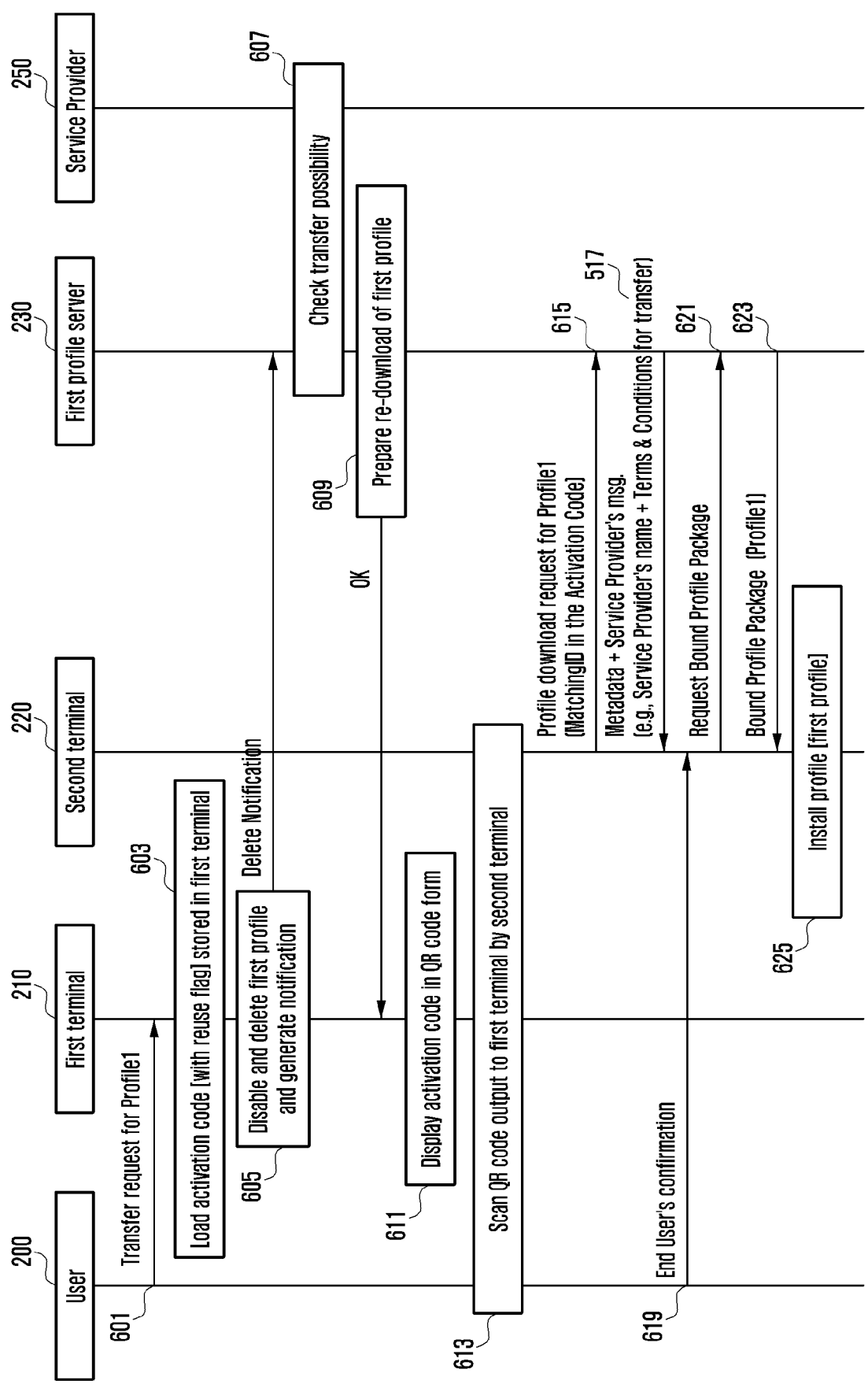
FIG. 6 is a diagram illustrating a procedure of downloading, by the first terminal according to an embodiment of the present disclosure, the same profile again by transmitting, to the second terminal, an activation code stored in the first terminal.

FIG. 6 is a diagram illustrating a procedure of downloading, by the first terminal according to an embodiment of the present disclosure, the same profile again by transmitting, to the second terminal, an activation code stored in the first terminal.

For configurations and descriptions of a user 200, a first terminal 210, a second terminal 220, a profile server 230, and a service provider 250 in FIG. 6, reference is made to FIG. 2. For example, the user 200, the first terminal 210, the second terminal 220, the profile server 230, and the service provider 250 may correspond to the user 200, the first terminal 210, the second terminal 220, the first profile server 230, and the service provider 250 in FIG. 2, respectively.

Referring to FIG. 6, in step 601, the user 200 may request the transfer of a first profile from the first terminal 210. To this end, the user 200 may confirm, through the first terminal 210, information (profile metadata) on the first profile and information that should be noted by the user attempting to transfer the first profile. The information on the first profile and the information that should be noted by the user attempting to transfer the first profile may have been stored in the first terminal 210 or the first profile. The information on the first profile may include a name or logo, a profile policy, etc. of the service provider 250, for example. The information that should be noted by the user attempting to transfer the first profile may include the number of remained profile transfers permitted by the service provider 250, a cost to be paid by the user for the profile transfer, etc., for example. Furthermore, an activation code that needs to be used by the terminal for the transfer of the profile and information indicating that the first profile is required to be deleted for the transfer of the first profile may have been stored in the first terminal 210 or the first profile. The activation code that needs to be used by the terminal for the transfer of the profile may be an activation code used to install the first profile in the first terminal in the past, for example. The information indicating that the first profile is required to be deleted for the transfer of the profile may be represented using a method, such as that a first Delete Profile flag has been set, a first Reuse Profile flag has been set, a first profile deletion-unnecessary (Do Not Delete Profile) flag has not been set or a new profile use flag has not been set, etc.

In step 603, the first terminal 210 may invoke the activation code that is stored in the first terminal 210 or the first profile and that needs to be used by the terminal for the transfer of the first profile. The activation code may include at least an address of the profile server 230 where the first profile is stored and an event identifier (MatchingID) connected to the first profile. In this case, a state of the first profile stored in the profile server 230 may have been set as a state in which download is not yet possible in order to prevent the first profile from being duplicated.

In step 605, the first terminal 210 may disable and delete the first profile, and may notify the profile server 230 of the results of the disabling and the results of the deletion. The results of the disabling and results of the deletion of the first profile may include at least a profile ID (ICCID) of the first profile. Step 605 may be performed using at least one of a Disable Profile message, a Delete Profile message, or a Handle Notification message, for example. Furthermore, FIG. 6 illustrates that the first terminal 210 notifies the profile server 230 of the results of the disabling and the results of the deletion, for convenience of this drawing. However, the results of the disabling and the results of the deletion may be delivered to another profile server (e.g., the second profile server 240 or a third profile server not illustrated in this drawing). The results of the disabling and the results of the deletion may be separately delivered. Furthermore, when a state of the first profile is already a disabled state, the operation of disabling, by the first terminal 210, the first profile and the operation of notifying, by the first terminal 210, the profile server 230 of the results of the disabling in step 605 may be omitted.

In step 607, the profile server 230 and the service provider 250 may check the transfer possibility of the first profile. If the first profile is transferable to another terminal, the profile server 230 and the service provider 250 may prepare the reuse of the first profile. Step 607 may be performed using at least one of a download order message, an Confirm Order message, a remote management order (RPM Order) message, an Release Order message, or Handle Notification, for example.

In step 609, the profile server 230 may identify that the first terminal 210 had deleted the first profile, and may set a state of the first profile as a downloadable state. Furthermore, the profile server 230 may notify the first terminal 210 that the state of the first profile is the downloadable state.

In step 611, the first terminal 210 may display the activation code on a screen by converting the activation code in the form of an image, such as a QR code, or in the form of a character string, and may notify the user that the activation code has been prepared.

In step 613, the user 200 may input, to the second terminal 220, the activation code displayed on the screen of the first terminal 210. A method of inputting the activation code may be performed using various methods, such as capturing an image, such as a QR code, using a camera or inputting a character string through a keyboard. Furthermore, if the first terminal 210 and the second terminal 220 are connected through short-distance communication (e.g., Bluetooth, NFC, WiFi, WiFi Direct, etc.), the first terminal 210 may directly deliver the activation code to the second terminal 220 without displaying the activation code on the screen in step 413a.

In step 615, the second terminal 220 may request the download of the first profile from the profile server 230. Step 615 may be performed using at least one of an Initiate Authentication message, a terminal Authenticate Client message, or a transfer request message, for example. Step 615 may include a procedure of delivering, by the second terminal 220, an event identifier (MatchingID) included in the activation code to the profile server 230. In step 615, the second terminal 200 may use WiFi for an Internet connection or may use an Internet tethering function provided by the first terminal 210.

In step 617, the profile server 230 may first identify whether a state of the first profile is a downloadable state. When the state of the first profile is a download-impossible state because it has not been identified that the first profile has been deleted from the first terminal through steps 605 to 609, the profile server 230 may transmit an error code as a response, and may terminate the operation. When the state of the first profile is the downloadable state, the profile server 230 may deliver, to the second terminal 220, the information (profile metadata) on the first profile and the information that should be noted by the user who downloads the first profile. The information on the first profile may include a name or logo, a profile policy, etc. of the service provider 250, for example. The information that should be noted by a user who downloads the first profile may include the number of remained profile transfers permitted by the service provider 250, a cost to be paid by the user for the profile transfer, etc., for example.

In step 619, the user 200 may confirm the information on the first profile and the information that should be noted by the user who downloads the first profile, and may agree on profile installation. The operation of agreeing on the profile installation may include an operation of selecting "Yes/No", inputting, by the user 200, a set password, or inputting bio information, such as a fingerprint or iris of the user 200.

In step 621, the second terminal 220 may notify the profile server 230 that the user 200 has agreed on the profile download, and may request a profile package.

In step 623, the profile server 230 may deliver the profile package for the first profile to the second terminal 220.

In step 625, the second terminal 220 may install the first profile by using the profile package for the first profile.

Figure 7A:
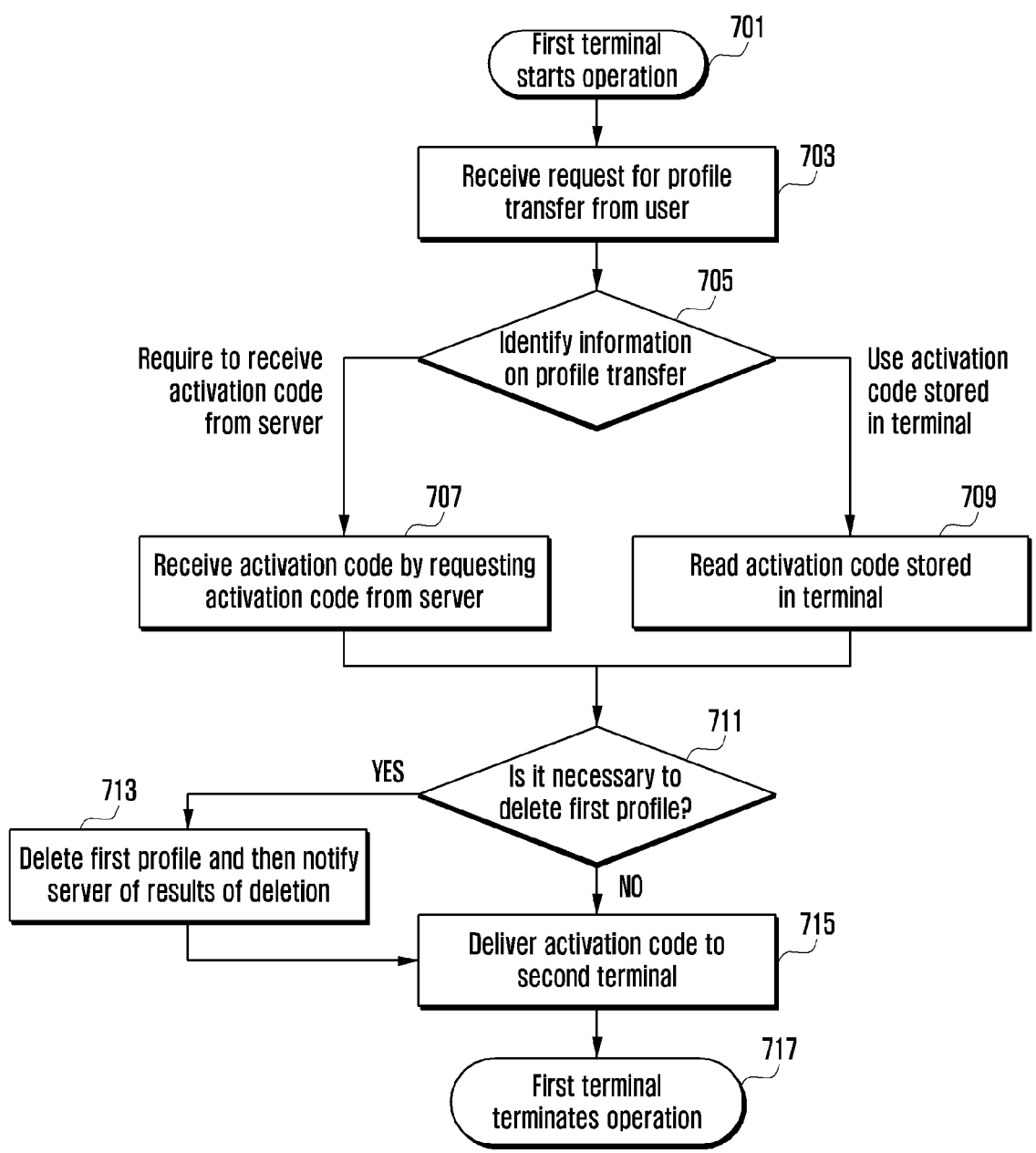
FIG. 7A is a flowchart illustrating an operational procedure of the first terminal according to an embodiment of the present disclosure.

FIG. 7A is a flowchart illustrating an operational procedure of the first terminal according to an embodiment of the present disclosure.

Figure 7B:
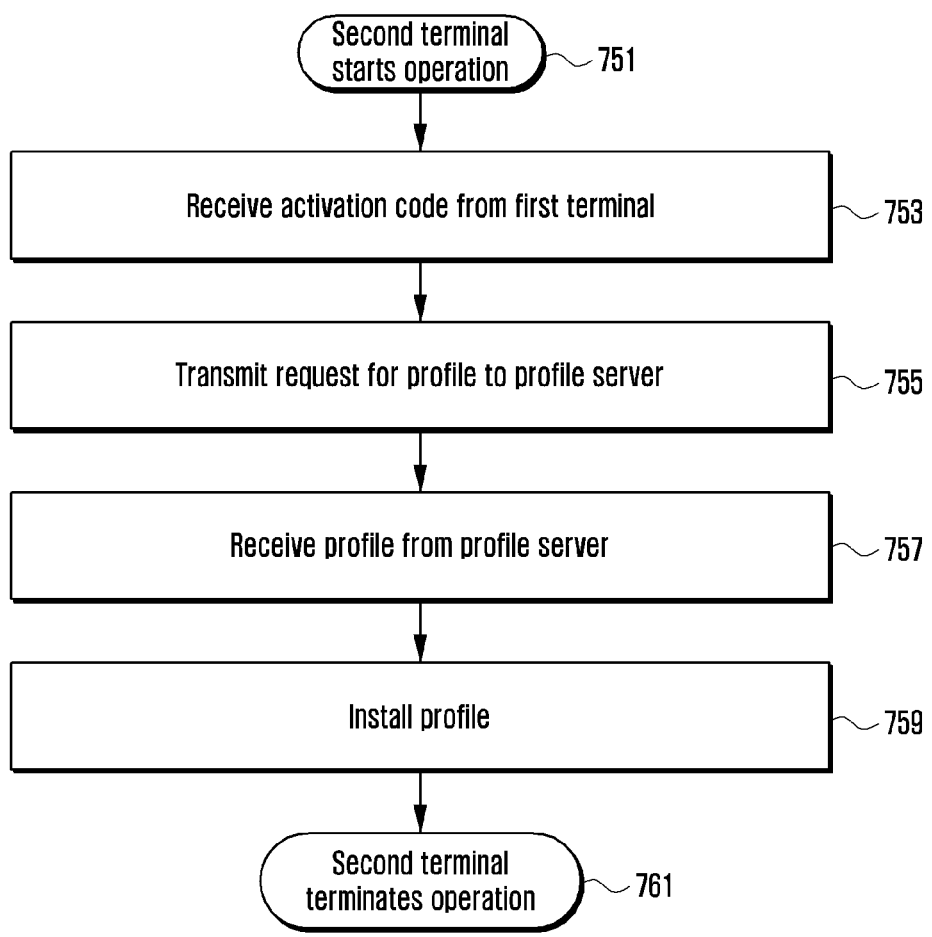
FIG. 7B is a flowchart illustrating an operational procedure of the second terminal according to an embodiment of the present disclosure.

FIG. 7B is a flowchart illustrating an operational procedure of the second terminal according to an embodiment of the present disclosure.

Each of terminals (the first terminal 210, the second terminal 220 and a terminal described without assigning reference numeral thereto) described in the present disclosure may correspond to the first terminal described with reference to FIG. 7A or the second terminal described with reference to FIG. 7B. Each of the first terminal 210 and the second terminal 220 may be an embodiment of the terminal in FIGS. 7A and 7B. Expressions "first" and "second" are merely used to indicate that terminals are physically different terminals.

Referring to FIG. 7A, in step 701, the first terminal may start an operation.

In step 703, the first terminal may receive a request for profile transfer from a user.

In step 705, the first terminal may identify information on the profile transfer. The information on the profile transfer may be information indicating whether an activation code necessary for the profile transfer has to be received from a server or whether an activation code stored in a terminal has to be used. If the activation code necessary for the profile transfer has to be received from the server, the information on the profile transfer may further include at least an address of the corresponding server. The first terminal may proceed to step 707. If the activation code stored in the terminal has to be used, the information on the profile transfer may further include information indicating whether a profile has to be first deleted at least before using the activation code stored in the terminal. The first terminal may proceed to step 709.

In step 707, the first terminal may receive the activation code by requesting the activation code from the server. A message in which the activation code is transmitted by the server as a response may further include information indicating whether a profile has to be first deleted before using the activation code.

In step 709, the first terminal may read the activation code stored in the terminal.

In step 711, the first terminal may identify whether it is necessary to delete a first profile. For a criterion for identifying whether it is necessary to delete the first profile, reference may be made to the information on the profile transfer identified in step 705 and the indication of the server received in step 707. If it is necessary to delete the first profile, the first terminal may proceed to step 713. If it is not necessary to delete the first profile, the first terminal may proceed to step 715.

In step 713, the first terminal may delete the first profile and may notify the server of the results of the deletion.

In step 715, the first terminal may deliver, to the second terminal, the activation code received from the server in step 707 or read in step 709. A method of delivering the activation code to the second terminal may be performed using a method of photographing, by the user, the activation code displayed on a screen of the first terminal in the form of an image, such as a QR code, by using a camera of the second terminal, inputting, by the user, the activation code displayed on a screen of the first terminal in the form of a character string to a keyboard of the second terminal, or connecting the first terminal and the second terminal through short-distance communication, such as Bluetooth, NFC, WiFi, or WiFi Direct, and delivering the activation code in the form of data. Step 715 may correspond to step 753.

In step 717, the first terminal may terminate the operation.

Referring to FIG. 7B, in step 751, the second terminal may start an operation.

In step 753, the second terminal may receive an activation code from the first terminal. For a method of receiving the activation code, reference is made to the description of step 715.

In step 755, the second terminal may request the download of a profile from the profile server.

In step 757, the second terminal may receive the profile from a profile server.

In step 759, the second terminal may install the profile.

In step 761, the second terminal may terminate the operation.

FIG. 8 is a flowchart illustrating an operational procedure of a profile server according to an embodiment of the present disclosure.

Each of profile servers (the first profile server 230, the second profile server 240 and the server described without assigning reference numeral thereto) described in the present disclosure may correspond to the profile server described with reference to FIG. 8. Each of the first profile server 230 and the second profile server 240 may be an embodiment of the server in FIG. 8. Expressions "first" and "second" are merely used to indicate that profile servers are physically different profile servers.

Referring to FIG. 8, in step 801, the profile server may start an operation.

In step 803, the profile server may receive a request for the transfer of a first profile from a terminal. The request for the transfer of the first profile may include at least a profile ID (ICCID) of the first profile, that is, an object to be transferred.

In step 805, the profile server may identify whether the first profile for which transfer has been requested by the terminal is a transferable profile. For a method of identifying whether the first profile is a transferable profile, reference may be made to a profile reuse policy of an operator. When the first profile is a transferable profile, the profile server may proceed to step 807. When the first profile is not a transferable profile, the profile server may proceed to step 815.

In step 807, the profile server may prepare the reuse of the first profile, and may prepare an activation code necessary for the download of the first profile. In step 807, a state of the prepared first profile may be set as a download-impossible state in order to prevent the duplication of the profile. In step 807, the prepared activation code may include at least an address of the profile server and an event identifier (MatchingID) connected to the first profile.

In step 809, the profile server may transmit the activation code to the terminal as a response, and may further notify the terminal that the first profile is required to be deleted.

In step 811, the profile server may wait for the terminal to provide notification of the results of the deletion of the first profile. In step 811, when the profile server receives the results of the deletion of the first profile from the terminal, the profile server may proceed to step 813.

In step 813, the profile server may change the state of the first profile into a downloadable state.

In step 815, the profile server may prepare a second profile, and may prepare an activation code necessary for the download of the second profile. In step 815, a state of the prepared second profile may be immediately set as the downloadable state. In step 815, the prepared activation code may include at least an address of the profile server and an event identifier (MatchingID) connected to the second profile.

In step 817, the profile server may transmit the activation code to the terminal as a response.

In step 819, the profile server may receive a profile download request from the terminal. The profile download request may include at least the event identifier connected to the first profile or the event identifier connected to the second profile.

In step 821, the profile server may identify whether a state of the first profile or the second profile for which download has been requested by the terminal is the downloadable state. When a state of the first profile or the second profile for which download has been requested by the terminal is the downloadable state, the profile server may proceed to step 823. When a state of the first profile or the second profile for which download has been requested by the terminal is not the downloadable state, the profile server may proceed to step 825.

In step 823, the profile server may transmit a profile package to the terminal as a response.

In step 825, the profile server may transmit, to the terminal, an error code indicating that the download of the profile is impossible as a response.

In step 827, the profile server may terminate the operation.

Figure 9:
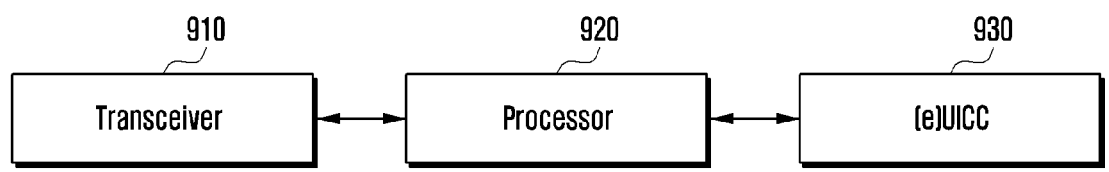
FIG. 9 is a block diagram illustrating elements of a terminal according to an embodiment of the present disclosure.

FIG. 9 is a block diagram illustrating elements of a terminal according to an embodiment of the present disclosure.

Each of terminals (the first terminal 210, the second terminal 220 and the terminal described without assigning reference numeral thereto) described in the present disclosure may correspond to the first terminal described with reference to FIG. 7A or the second terminal described with reference to FIG. 7B. Each of the first terminal 210 and the second terminal 220 may be an embodiment of the terminal in FIGS. 7A and 7B. Expressions "first" and "second" are merely used to indicate that terminals are physically different terminals.

As illustrated in FIG. 9, the terminal may include a transceiver 910 and a processor 920. Furthermore, the terminal may include a UICC 930. For example, the UICC 930 may be inserted into the terminal or may be an eUICC embedded in the terminal.

The transceiver 910 may transmit and receive signals, information, data, etc. to and from a profile server.

The transceiver 910 according to an embodiment of the present disclosure may transmit, to the profile server, a message to request an activation code, may receive the activation code and whether it is necessary to delete a profile from the profile server, and may transmit the results of the deletion of the profile to the profile server.

The transceiver 910 according to an embodiment of the present disclosure may transmit, to the profile server, a message to request a profile by using an activation code, and may receive a profile package.

The processor 920 is an element that generally controls the terminal. The processor 920 may control an overall operation of the terminal according to various embodiments of the present disclosure. The processor 920 may be named a controller. According to an embodiment of the present disclosure, the processor 920 may include at least one processor.

The processor 920 according to an embodiment of the present disclosure may control the terminal to receive a profile transfer request from a user, to confirm profile transfer information, to transmit a message to request an activation code to a profile server, to receive an activation code and whether it is necessary to delete a profile from the profile server, to delete the profile, to transmit the results of the deletion of the profile to the profile server, and to deliver the activation code to another terminal.

The processor 920 according to an embodiment of the present disclosure may control the terminal to receive an activation code from another terminal, to transmit a message to request a profile to a profile server by using the activation code, to receive a profile package from the profile server, and to install the profile package.

The UICC 930 according to an embodiment of the present disclosure may download a profile and install the profile. Furthermore, the UICC 930 may manage the profile.

The UICC 930 may operate under the control of the processor 920. Alternatively, the UICC 930 may include a processor or controller for installing a profile or an application may have been installed in the UICC 930. A part of the application may have been installed in the processor 920.

The terminal may further include a storage unit (not illustrated), and may store data, such as a basic program, an application program, or setting information for an operation of the terminal. Furthermore, the storage unit may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor 920 may perform various operations by using various programs, content, data, etc. stored in the storage unit.

Figure 10:
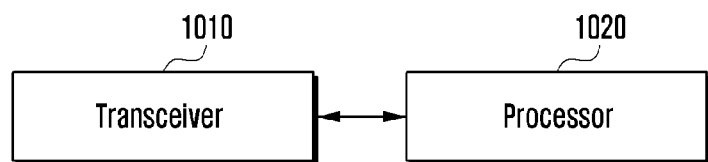
FIG. 10 is a block diagram illustrating elements of a profile server according to an embodiment of the present disclosure.

FIG. 10 is a block diagram illustrating elements of the profile server according to an embodiment of the present disclosure.

Each of profile servers (the first profile server 230, the second profile server 240 and the server described without assigning reference numeral thereto) described in the present disclosure may correspond to the profile server described with reference to FIG. 8. Each of the first profile server 230 and the second profile server 240 may be an embodiment of the server in FIG. 8. Expressions "first" and "second" are merely used to indicate that profile servers are physically different profile servers.

Referring to FIG. 10, the profile server may include a transceiver 1010 and a processor 1020.

The transceiver 1010 may transmit and receive signals, information, data, etc. to and from a terminal or an operator.

The transceiver 1010 according to an embodiment of the present disclosure may receive a profile transfer request message from a terminal, may transmit, to the terminal, a message including an activation code and whether it is necessary to delete a profile, may receive a profile deletion message from the terminal, may receive a profile download request message from the terminal, may transmit a profile package to the terminal when a state of the profile is a downloadable state, and may transmit an error code when the state of the profile is a download-impossible state.

The processor 1020 is an element for generally controlling the profile server. The processor 1020 may control an overall operation of the profile server according to various embodiments of the present disclosure. The processor 1020 may be named a controller. According to an embodiment of the present disclosure, the processor 1020 may include at least one processor.

The processor 1020 according to an embodiment of the present disclosure may control the profile server to receive a profile transfer request message from a terminal, to identify whether a profile is transferable, to generate an activation code on which the profile is downloadable, to set a state of the profile as a download-impossible state when the transfer of the profile is possible, to set a state of the profile as a downloadable state when the transfer of the profile is impossible, to transmit, to the terminal, a message including the activation code and whether it is necessary to delete the profile, to receive the results of deletion of the profile from the terminal, to change a state of the profile into the downloadable state, to receive a profile download request message from the terminal, to determine whether a state of the profile is the downloadable state, to transmit a profile package to the terminal when the state of the profile is the downloadable state, and to transmit an error code when the state of the profile is the download-impossible state.

The profile server may further include a storage unit (not illustrated), and may store data, such as a basic program, an application program, or setting information for an operation of the profile server. Furthermore, the storage unit may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Furthermore, the processor

1020 may perform various operations by using various programs, content, data, etc. stored in the storage unit.

According to an embodiment of the present disclosure, in a wireless communication system, a terminal may receive a request from a user who attempts to install, in another terminal, a profile installed in a terminal for a network connection. Furthermore, the terminal may request an activation code for downloading the profile from a profile server with reference to profile transfer information stored in the terminal or may read the activation code stored in the terminal. Furthermore, the terminal may delete a profile, that is, an object to be transferred, in response to a request from the profile server or with reference to profile transfer information stored in the terminal. Furthermore, the terminal may receive, from the profile server, the activation code stored in the terminal or deliver the activation code to another terminal through a user input, if necessary. Furthermore, the terminal may download the profile from the profile server by using the activation code.

According to an embodiment of the present disclosure, in a wireless communication system, a profile server may generate a profile for enabling a terminal to access a network and an activation code necessary for profile download. Furthermore, the profile server may identify whether the transfer of the profile is possible in response to a profile transfer request received from the terminal, may transmit, to the terminal, an activation code on which the profile to be transferred may be downloaded and a profile deletion request when the transfer of the profile is possible, may transmit, to the terminal, an activation code on which a new profile may be downloaded when the transfer of the profile is impossible, may receive, from the terminal, the results of deletion of the profile to be transferred, may change a state of the profile into a downloadable state, may receive a profile download request from the terminal, may identify whether the profile is downloadable, and may transmit the profile to the terminal when the profile is downloadable.

In the aforementioned detailed embodiments of the present disclosure, the components included in the present disclosure have been expressed in the singular or plural form depending on a proposed detailed embodiment. However, the singular or plural expression has been selected suitably for a situation proposed for convenience of description, and the present disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the present disclosure, the present disclosure may be modified in various ways without departing from the scope of the present disclosure. Accordingly, the scope of the present disclosure should not be limited to the aforementioned embodiments, but should be defined by not only the claims, but equivalents thereof.

Various embodiments of the present disclosure and the terms used in the embodiments are not intended to limit the technology described in the present disclosure to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In the present disclosure, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

The term "module" used in the present disclosure includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

Various embodiments of the present disclosure may be implemented as software (e.g., a program) including instructions stored in machine (e.g., computer)-readable storage media (e.g., an internal memory or an external memory). A device is an apparatus which may invoke a stored instruction from the storage media and may operate in response to the invoked instruction, and may include a terminal (e.g., the first terminal 210, the second terminal 220) according to various embodiments of the present disclosure. When the instruction is executed by a processor (e.g., the processor 920 in FIG. 9 or the processor 1020 in FIG. 10), the processor may perform a function, corresponding to the instruction, directly or by using other elements under the control of the processor. The instruction may include a code generated or executed by a compiler or an interpreter.

The machine-readable storage media may be provided in the form of a non-transitory storage medium. In this case, "non-transitory" merely means that the storage media do not include a signal and are tangible, and does not distinguish between cases where data is semi-permanently or temporally stored in the storage media.

The method according to various embodiments disclosed in the present disclosure may be included in a computer program product and provided. The computer program product may be traded as a product between a seller and a buyer. The computer program product may be distributed in the form of a device-readable storage medium (e.g., a compact disc read only memory (CD-ROM)) or through an app store (e.g., PlayStore™) online. In the case of the online distribution, at least some of the computer program product may be at least temporarily stored or provisionally generated in storage media, such as a memory in a server of a manufacturer, a server of an app store or a relay server.

Each of the elements (e.g., modules or programs) according to various embodiments may consist of a single entity or a plurality of entities. Some of the aforementioned corresponding sub-elements may be omitted or other sub-elements may be further included in various embodiments. Alternatively or additionally, some elements (e.g., modules or programs) may be integrated into a single entity. The single entity may perform a function performed by each of corresponding elements before they are integrated identically or similarly Operations performed by a module, a program or other elements according to various embodiments may be executed sequentially, in parallel, repeatedly or heuristically, or at least some operations may be executed in different orders or may be omitted, or other operations may be added.

What is claimed is:

1. A method performed by a first terminal in a wireless communication system, comprising:
   transmitting, to a server, a request message for a device change associated with a first profile in the first terminal; and
   receiving, from the server, an activation code for the first profile and information notifying that a deletion of the first profile is required, in case that a new profile is not required for the device change; and
   receiving, from the server, an activation code for a second profile, in case that the new profile is required for the device change.

2. The method of claim 1, further comprising:
   transmitting, to a second terminal, the activation code for the second profile.

3. The method of claim 1, further comprising:
   transmitting, to a second terminal, the activation code for the first profile;
   deleting the first profile in the first terminal based on the information notifying that the deletion of the first profile is required; and
   transmitting, to the server, a result of the deletion of the first profile.

4. A first terminal in a wireless communication system, the first terminal comprising:
   a transceiver; and
   a controller coupled to the transceiver and configured to:
   transmit, to a server, a request message for a device change associated with a first profile in the first terminal, and
   receive, from the server, an activation code for the first profile and information notifying that a deletion of the first profile is required, in case that a new profile is not required for the device change, and
   receive, from the server, an activation code for a second profile, in case that the new profile is required for the device change.

5. The first terminal of claim 4,
   wherein the controller is further configured to:
   transmit, to a second terminal, the activation code for the second profile.

6. The first terminal of claim 4,
   wherein the controller is further configured to:
   transmit, to a second terminal, the activation code for the first profile,
   delete the first profile in the first terminal based on the information notifying that the deletion of the first profile is required, and
   transmit, to the server, a result of the deletion of the first profile.

7. The first terminal of claim 4,
   wherein the controller is further configured to:
   transmit, to the server, information on confirmation of user for the device change associated with the first profile in the first terminal.

8. The first terminal of claim 4,
   wherein the activation code is provided in a QR code.

9. The method of claim 1, further comprising:
   transmitting, to the server, information on confirmation of user for the device change associated with the first profile in the first terminal.

10. The method of claim 1,
    wherein the activation code is provided in a QR code.

11. A method performed by a server in a wireless communication system, the method comprising:
    receiving, from a first terminal, a request message for a device change associated with a first profile in the first terminal;
    in case that a new profile is not required for the device change, transmitting, to the first terminal, an activation code for the first profile and information notifying that a deletion of the first profile is required; and
    in case that the new profile is required for the device change, transmitting, to the first terminal, an activation code for a second profile.

12. The method of claim 11, further comprising:
    receiving, from the first terminal, information on confirmation of user for the device change associated with the first profile in the first terminal.

13. A server in a wireless communication system, the server comprising:
    a transceiver; and
    a controller coupled to the transceiver and configured to:
    receive, from a first terminal, a request message for a device change associated with a first profile in the first terminal,
    in case that a new profile is not required for the device change, transmit, to the first terminal, an activation code for the first profile and information notifying that a deletion of the first profile is required, and
    in case that the new profile is required for the device change, transmit, to the first terminal, an activation code for a second profile.

14. The server of claim 13,
    wherein the controller is further configured to:
    receive, from the first terminal, information on confirmation of user for the device change associated with the first profile in the first terminal.

* * * * *